US009863338B2

(12) United States Patent
Higashio et al.

(10) Patent No.: US 9,863,338 B2
(45) Date of Patent: Jan. 9, 2018

(54) ENGINE CONTROL APPARATUS

(71) Applicant: MAZDA MOTOR CORPORATION, Hiroshima (JP)

(72) Inventors: Masayoshi Higashio, Hiroshima (JP); Yukio Haizaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 21 days.

(21) Appl. No.: 15/016,932

(22) Filed: Feb. 5, 2016

(65) Prior Publication Data
US 2016/0237920 A1    Aug. 18, 2016

(30) Foreign Application Priority Data
Feb. 18, 2015    (JP) ................. 2015-029361

(51) Int. Cl.
*F02D 37/02*    (2006.01)
*F02P 5/04*    (2006.01)
(Continued)

(52) U.S. Cl.
CPC ............ *F02D 37/02* (2013.01); *F01L 1/2405* (2013.01); *F01L 13/0005* (2013.01); *F02D 13/06* (2013.01); *F02D 41/0002* (2013.01); *F02D 41/0087* (2013.01); *F02D 41/0225* (2013.01); *F02P 5/045* (2013.01); *F02P 5/1504* (2013.01); *F02P 5/1512* (2013.01); *F01L 1/185* (2013.01);
(Continued)

(58) Field of Classification Search
CPC .. F02D 37/02; F02D 41/0087; F02D 41/0002; F02D 13/06; F02D 41/0225; F01L 1/2405; F01L 13/0005; F01L 2105/00; F01L 2013/001; F01L 2001/0537; F01L 1/185; F02P 5/1512; F02P 5/1504; F02P 5/045

See application file for complete search history.

(56) References Cited

U.S. PATENT DOCUMENTS

| 7,013,866 | B1* | 3/2006 | Prucka | ............... F02D 41/10 |
|  |  |  |  | 123/319 |
| 2003/0172900 | A1* | 9/2003 | Boyer | .................. F01L 1/34 |
|  |  |  |  | 123/198 F |

(Continued)

FOREIGN PATENT DOCUMENTS

JP    H05-332172 A    12/1993

Primary Examiner — Joseph Dallo
Assistant Examiner — Kurt Liethen
(74) Attorney, Agent, or Firm — Studebaker & Brackett PC

(57) ABSTRACT

When a difference between a target intake air amount during the reduced-cylinder operation, which is greater than a target intake air amount during the all-cylinder operation in a normal state, and an actual intake air amount is greater than an allowable deficient intake air amount, a preparatory control for increasing the actual intake air amount and shifting an ignition timing toward a retard side with respect to an ignition timing during the all-cylinder operation in the normal state. Then, at a time when the difference between the target intake air amount and the actual intake air amount becomes equal to or less than the allowable deficient intake air amount, the reduced-cylinder operation is started, wherein the allowable deficient intake air amount is set to a larger value when a current speed stage is a high speed stage than when it is a low speed stage.

5 Claims, 11 Drawing Sheets

(51) Int. Cl.
  *F02D 41/00* (2006.01)
  *F02D 41/02* (2006.01)
  *F02P 5/15* (2006.01)
  *F02D 13/06* (2006.01)
  *F01L 1/24* (2006.01)
  *F01L 13/00* (2006.01)
  *F01L 1/18* (2006.01)
  *F01L 1/053* (2006.01)

(52) U.S. Cl.
  CPC . *F01L 2001/0537* (2013.01); *F01L 2013/001* (2013.01); *F01L 2105/00* (2013.01); *F02D 2041/001* (2013.01); *F02D 2200/101* (2013.01); *F02D 2200/602* (2013.01); *Y02T 10/18* (2013.01); *Y02T 10/42* (2013.01); *Y02T 10/46* (2013.01)

(56) References Cited

U.S. PATENT DOCUMENTS

2003/0213466 A1* 11/2003 Rayl ............... F02D 11/105
  123/399
2016/0053697 A1* 2/2016 Pirjaberi ............ F02D 17/02
  123/406.45

\* cited by examiner

ENGINE CONTROL APPARATUS

TECHNICAL FIELD

The present invention relates to an apparatus for controlling an engine switchable between an all-cylinder operation in which combustion of an air-fuel mixture is performed in all of a plurality of cylinders and a reduced-cylinder operation in which the combustion in a specific part of the cylinders is stopped.

BACKGROUND ART

In the field of multi-cylinder engines having a plurality of cylinders, there has heretofore been known a technique, so-called "reduced-cylinder operation" in which a part of the cylinders is deactivated by stopping combustion therein.

During the reduced-cylinder operation, the number of activated cylinders is reduced, thereby possibly leading to a decrease in power output of the entire engine. Therefore, it is common practice to execute, during the reduced-cylinder operation, a control for increasing an actual intake air amount, i.e., an amount of air to be taken into each of the activated cylinders, so as to increase a power output of the activated cylinders.

In this case, however, the actual intake air amount is increased with a certain delay. Thus, if the control for increasing the actual intake air amount is started simultaneously with start of the reduced-cylinder operation, the actual intake air amount becomes deficient at start of the reduced-cylinder operation, thereby leading to the occurrence of a decrease in engine power output, i.e., torque shock, resulting in deteriorated ride comfort.

As one measure against this problem, it is conceivable to preliminarily increase the actual intake air amount before start of the reduced-cylinder operation. However, if the actual intake air amount is increased in a state before the start of the reduced-cylinder operation, i.e., in a state in which combustion is performed in all cylinders, an engine power output before the start of the reduced-cylinder operation becomes excessive, in this case.

In this regard, the following Patent Literature 1 discloses an apparatus configured to shift a throttle valve provided in an intake passage toward its fully-open side, before start of a reduced-cylinder operation, to increase an actual intake air amount to a value suitable for the reduced-cylinder operation, and controllably set an ignition timing in each cylinder to a retard side, to thereby increase the actual intake air amount while suppressing an increase in engine power output, before the start of the reduced-cylinder operation.

CITATION LIST

Patent Literature

Patent Literature 1: JPH05-332172A

SUMMARY OF INVENTION

The apparatus disclosed in the Patent Literature 1 can suppress the occurrence of torque shock during switching from an all-cylinder operation to a reduced-cylinder operation, to provide good riding comfort. However, in this apparatus, the reduced-cylinder operation cannot be started until the actual intake air amount reaches a target value of the intake air amount (target intake air amount) during the reduced-cylinder operation, thereby causing a problem of failing to start the reduced-cylinder operation at an early stage.

The present invention has been made in view of the above circumstances, and an object thereof is to provide an engine control apparatus capable of starting a reduced-cylinder operation at an earlier stage, while ensuring good riding comfort.

In order to achieve the above object, the present invention provides, an engine control apparatus for controlling an engine mounted on a vehicle body, wherein the engine has a plurality of cylinders and is switchable between an all-cylinder operation in which combustion of an air-fuel mixture is performed in all of the cylinders and a reduced-cylinder operation in which the combustion in a specific part of the cylinders is stopped. The engine control apparatus comprises: an ignition device provided in each of the cylinders to ignite an air-fuel mixture in the cylinder; an intake air amount changing device capable of changing an intake air amount which is an amount of air to be taken into each of the cylinders; and a control device for controlling a plurality of target devices of the engine including the ignition device and the intake air amount changing device, wherein the control device is operable, upon issuance of a switching demand for switching from the all-cylinder operation to the reduced-cylinder operation, to set a target value of the intake air amount to a transient value which is greater than a target value of the intake air amount during the all-cylinder operation in a normal state in which there is no switching demand, and, when a difference between the transient target intake air amount and an actual intake air amount is greater than an allowable deficient intake air amount, to execute, before starting the reduced-cylinder operation, a preparatory control for increasing the actual intake air amount by the intake air amount changing device, and shifting an ignition timing of the ignition device toward a retard side with respect to an ignition timing during the all-cylinder operation in the normal state so as to cancel out a fluctuation in engine torque which would otherwise be caused by the increase in the actual intake air amount, and then start the reduced-cylinder operation at a time when the difference between the transient target intake air amount and the actual intake air amount becomes equal to or less than the allowable deficient intake air amount, and wherein the allowable deficient intake air amount is set to a larger value when a current speed stage of a vehicle transmission is a high speed stage than when it is a low speed stage.

The engine control apparatus of the present invention makes it possible to start a reduced-cylinder operation at an earlier stage, while ensuring good riding comfort.

DESCRIPTION OF EMBODIMENTS (1) Overall Configuration of Engine

Figure 1:
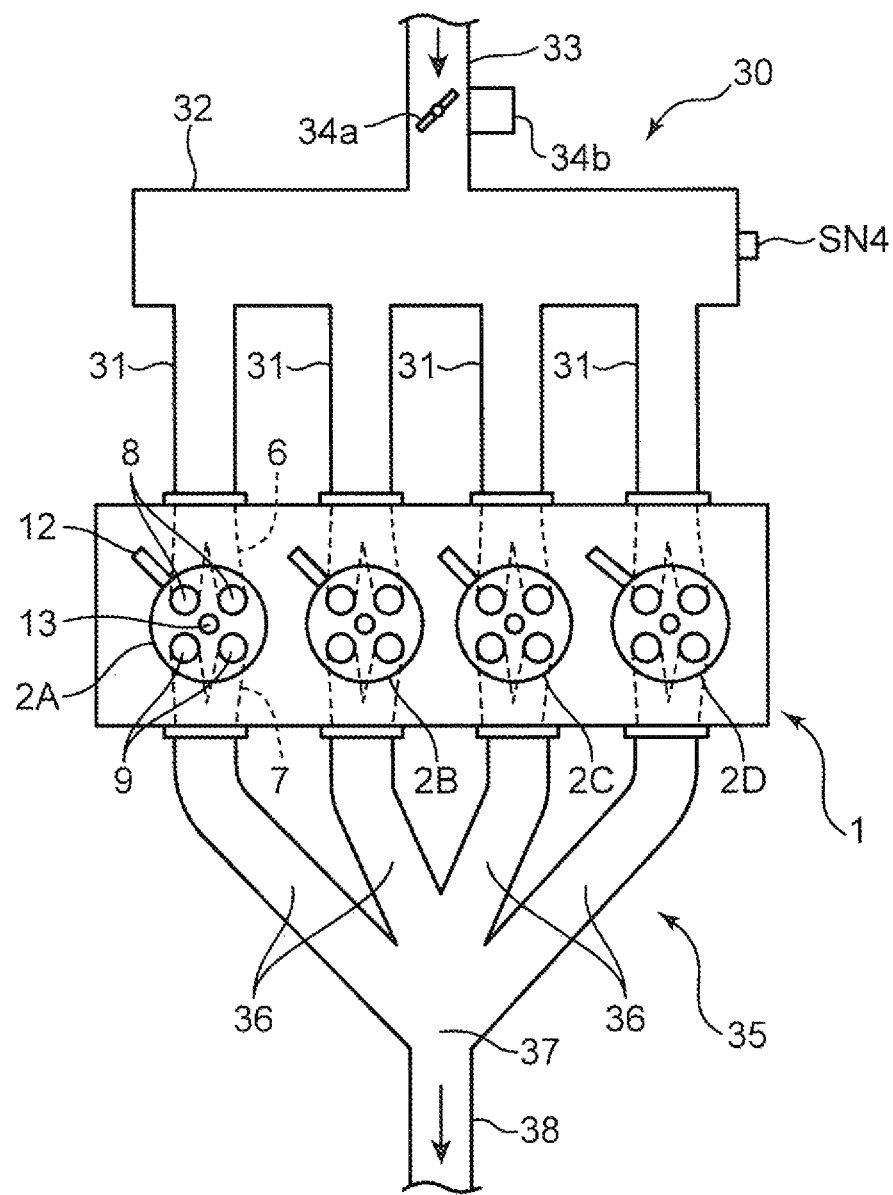
FIG. 1 is a schematic top plan view illustrating an overall configuration of an engine equipped with an engine control apparatus according to one embodiment of the present invention.

FIG. 1 is a schematic diagram illustrating an engine employing an engine control apparatus according to one embodiment of the present invention. The engine illustrated in FIG. 1 is a four-cycle multi-cylinder gasoline engine mounted to a vehicle body to serve as a running power source. More specifically, this engine comprises: an in-line four-cylinder engine body 1 having four cylinders 2A to 2D arranged side-by-side linearly; an intake passage 30 for introducing air into the engine body 1; and an exhaust passage 35 for discharging exhaust gas produced in the engine body 1.

Figure 2:
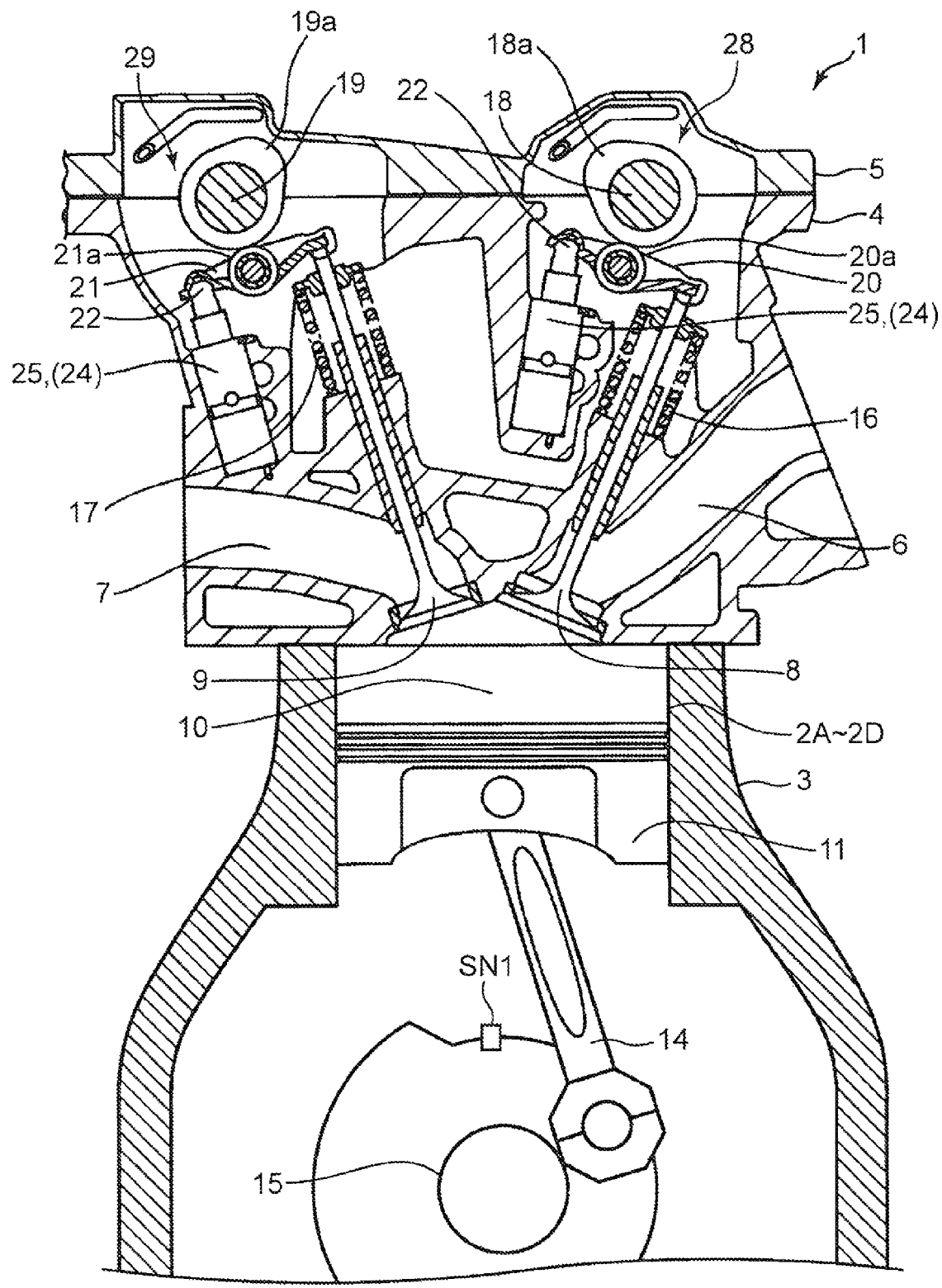
FIG. 2 is a sectional view of an engine body of the engine in FIG. 1.

FIG. 2 is a sectional view of the engine body 1. As illustrated in FIG. 2, the engine body 1 comprises: a cylinder block 3 having the four cylinders 2A to 2D formed thereinside; a cylinder head 4 provided on an upper side of the cylinder block 3; a cam cap 5 provided on an upper side of the cylinder head 4; and four pistons 11 each inserted into a respective one of the cylinders 2A to 2D in a reciprocatingly slidable manner.

In each cylinder, a combustion chamber 10 is defined just above the piston 11. Gasoline-based fuel injected from an injector 12 (FIG. 1) is supplied to the combustion chamber 10. The supplied fuel is combusted in the combustion chamber 10. The piston 11 is configured to be reciprocatingly moved in an up-down direction while being pushed downwardly by an expansion force arising from the combustion.

The piston 11 is coupled to a crankshaft 15 serving as an output shaft of the engine body 1, via a connecting rod 14. The crankshaft 15 is configured to be rotated about its central axis according to the reciprocating movement of the piston 11.

As illustrated in FIG. 1, the cylinder head 4 is provided with a plurality of injectors 12 each operable to inject fuel toward an associated one of the combustion chambers 10 of the cylinders 2A to 2D, and a plurality of spark plugs (ignition devices) 13 each operable to ignite an air-fuel mixture, i.e., a mixture of air and fuel injected from an associated one or more of the injectors 12 by means of spark discharge. In this embodiment, the injector 12 is provided in a number of one per cylinder, i.e., in a number of four in total, and the spark plug 13 is provided in a number of one per cylinder, i.e., in a number of four in total.

In the four-cycle four-cylinder gasoline engine as in this embodiment, any two pistons 11 provided in successive ones of the cylinders 2A to 2D in a firing (ignition) order are moved in the up-down movement with a phase difference of 180 degrees in terms of crank angle (180 degrees CA) therebetween. Correspondingly, ignition timings in the successive ones of the cylinders 2A to 2D in the firing order are set to respective time points whose phases are offset from each other by 180 degrees CA. Specifically, in order from the left side, the cylinder 2A, the cylinder 2B, the cylinder 2C and the cylinder 2D are defined, respectively, as a first cylinder, a second cylinder, a third cylinder and a fourth cylinder, ignition is performed in the following order: the first cylinder 2A→the third cylinder 2C→the fourth cylinder 2D→the second cylinder 2B.

The engine in this embodiment is a variable cylinder engine (variable displacement engine) capable of performing a reduced-cylinder operation, i.e., an operation in which two of the four cylinders 2A to 2D are deactivated without performing combustion therein, and the remaining two cylinders are activated. The above firing order is applied to a normal operation (all-cylinder operation in which all of the four cylinders 2A to 2D are activated) other than the reduced-cylinder operation. On the other hand, during the reduced-cylinder operation, in two of the cylinders which are non-successive in terms of firing order (in this embodiment, the first cylinder 2A and the fourth cylinder 2D), an ignition function of corresponding two of the spark plugs 13 is inhibited, so that ignition is performed in an alternately skipping manner in the above firing order.

As illustrated in FIGS. 1 and 2, the cylinder head 4 has a plurality of intake ports 6 each formed to introduce air (intake air) supplied from the intake passage, into an associated one of the combustion chambers 10 of the cylinders 2A to 2D, and a plurality of exhaust ports 7 each formed to lead exhaust gas produced in an associated one of the combustion chambers 10 of the cylinders 2A to 2D, to the exhaust passage 35. Further, the cylinder head 4 is provided with a plurality of intake valves 8 each operable to open and close a combustion chamber-side opening of an associated one of the intake ports 6 so as to control introduction of intake air through the associated intake ports 6, and a plurality of exhaust valves 9 each operable to open and close a combustion chamber-side opening of an associated one of the exhaust ports 7 so as to control discharge of exhaust gas from the associated exhaust ports 7. In this embodiment, the intake valve 8 is provided in a number of two per cylinder, i.e., in a number of eight in total, and the exhaust valve 9 is provided in a number of two per cylinder, i.e., in a number of eight in total.

As illustrated in FIG. 1, the intake passage 30 comprises: four independent intake passages 31 communicated, respectively, with the intake ports 6 of the cylinders 2A to 2D; a surge tank 32 commonly connected to respective upstream ends (ends on an upstream side in an intake air flow direction) of the independent intake passages 31; and one intake pipe 33 extending from the surge tank 32 toward the upstream side. A throttle valve 34a is interposed in the intake pipe 33 so as to open and close an internal passage of the intake pipe 33. The intake pipe 33 is provided with a valve actuator 34b for driving the throttle valve 34a. The valve actuator 34b is operable to open and close the throttle valve 34a. According to opening and closing of the throttle valve 34a, a flow rate of intake air to be introduced into the engine body 1 is changed. Thus, the throttle valve 34a and the valve actuator 34b function as an intake air amount changing device capable of changing an actual intake air amount which is an amount of air to be taken into each of the cylinders 2A to 2D.

The exhaust passage 35 comprises: four independent exhaust passages 36 communicated, respectively, with the exhaust ports 7 of the cylinders 2A to 2D; a merged portion 37 into which respective downstream ends (ends on a downstream side in an exhaust gas flow direction) of the independent exhaust passages 36 are merged; and one exhaust pipe 38 extending from the merged portion 37 toward the downstream side.

(2) Valve Operation Mechanism

Figure 3:
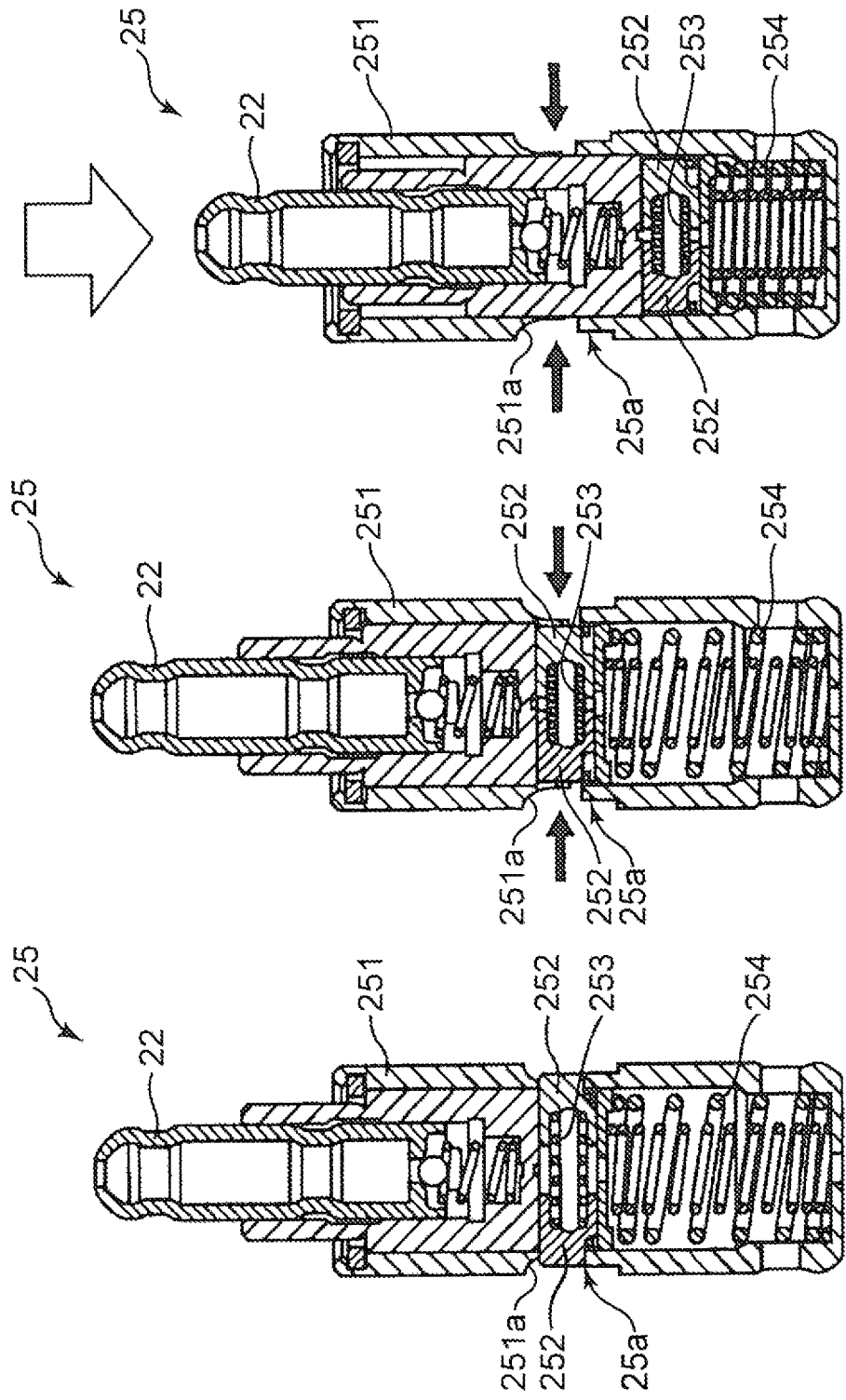
FIG. 3A is a schematic sectional view illustrating a valve stopping mechanism in a situation where a pivot member is in a locked state.
FIG. 3B is a schematic sectional view illustrating the valve stopping mechanism just before the pivot member is shifted to an unlocked state.
FIG. 3C is a schematic sectional view illustrating the valve stopping mechanism in a situation where the pivot member is in the unlocked state.

With reference to FIGS. 2 and 3, a mechanism for opening and closing the intake valves 8 and the exhaust valves 9 will be described in detail below.

A group of the eight intake valves 8 and a group of the eight exhaust valves 9 are configured to be openably and closably driven, respectively, by a pair of valve operation mechanisms 28, 29, interlockingly with rotation of the crankshaft 15.

The valve operation mechanism 28 for the eight intake valves 8 comprises: eight return springs 16 each biasing a respective one of the intake valves 8 in a closing direction (in FIG. 2, upwardly); a camshaft 18 configured to be rotated interlockingly with rotation of the crankshaft 15; eight cam portions 18a provided on the camshaft 18 in an integrally rotatable manner; eight swing arms 20 each configured to be periodically pushed by a respective one of the cam portions 18a; and eight pivot members 22 each serving as a swing support point of a respective one of the swing arms 20.

Similarly, the valve operation mechanism 29 for the eight exhaust valves 9 comprises: eight return springs 17 each biasing a respective one of the exhaust valves 9 in a closing direction (in FIG. 2, upwardly); a camshaft 19 configured to be rotated interlockingly with rotation of the crankshaft 15; eight cam portions 19a provided on the camshaft 19 in an integrally rotatable manner; eight swing arms 21 each configured to be periodically pushed by a respective one of the cam portions 19a; and eight pivot members 22 each serving as a swing support point of a respective one of the swing arms 20.

Each of the intake valves 8 (exhaust valves 9) is openably and closably driven by the above valve operation mechanism 28 (29) in the following manner. Upon rotation of the can shaft 18 (19) according to rotation of the crankshaft 15, a cam follower 20a (21a) rotatably provided in an approximately central portion of a corresponding one of the swing arms 20 (21) is periodically pushed downwardly by a corresponding one of the cam portions 18a (19a). Thus, the swing arm 20 (21) is swingingly displaced about a corresponding one of the pivot members 22 supporting one end of the swing arm 20 (21) to serve as a support point. Along with the displacement, the other end of the swing arm 20 (21) pushes the intake valve 8 (exhaust valve 9) against a biasing force of a corresponding one of the return springs 16 (17). In this way, the intake valve 8 (exhaust valve 9) is opened. After the intake valve 8 (exhaust valve 9) is moved to an opened position, it is returned to a closed position again by the biasing force of the return spring 16 (17).

Each of the pivot members 22 is supported by a heretofore-known hydraulic lash adjuster (hereinafter abbreviated as "HLA") (24, 25) for automatically adjusting a valve clearance to zero. Among the eight HLAs, two pairs of two HLAs 24 are provided to automatically adjust a valve clearance, respectively, in the second cylinder 2B and the third cylinder 2C located on a central region of the engine body 1 in a cylinder row direction. On the other hand, two pairs of two HLAs 25 are provided to automatically adjust a valve clearance, respectively, in the first cylinder 2A and the fourth cylinder 2D located on opposite ends of the engine body 1 in the cylinder row direction.

The HLAs 25 for the first and fourth cylinders 2A, 2D have a function of switching between activation and deactivation of the opening-closing movements of the intake and exhaust valves 8, 9, depending on the all-cylinder operation and the reduced-cylinder operation. Specifically, the HLAs 25 are operable, during the all-cylinder operation, to activate the opening-closing movements of the intake and exhaust valves 8, 9 of the first and fourth cylinders 2A, 2D. On the other hand, the HLAs 25 are operable, during the reduced-cylinder operation, to deactivate the opening-closing movements of the intake and exhaust valves 8, 9 of the first and fourth cylinders 2A in such a manner as to keep each of the intake and exhaust valves 8, 9 in a closed state. As a mechanism for deactivating the opening-closing movements of the intake and exhaust valves 8, 9, each of HLAs 25 has a valve deactivation mechanism 25a illustrated in FIG. 3A to 3C. In contrast, each of HLAs 24 for the second and third cylinders 2B, 2C is devoid of the valve deactivation mechanism 25a, so that it does have any function of deactivating the opening-closing movements of the intake and exhaust valves 8, 9. In order to distinguish the HLAs 25 from the HLAs 24, each of the HLAs 25 having the valve deactivation mechanism 25a will hereinafter be referred to particularly as "S-HLA (abbreviation for Switchable-Hydraulic Lash Adjuster) 25".

The valve deactivation mechanism 25a of the S-HLA 25 comprises a bottomed outer casing 251, a pair of lock pins 252, a lock spring 253 and a lost motion spring 254.

The outer casing 251 receives therein the pivot member 22 in an axially slidable manner. The outer casing 251 has a peripheral wall formed with two through-holes 251a at respective positions opposed to each other. Each of the lock pins 252 is configured to be moved in and out with respect to a respective one of the through-holes 251a to thereby switch the pivot member 22 to a locked state or an unlocked state. The lock spring 253 biases the lock pins 252 oppositely in a radially outward direction of the outer casing 251. The lost motion spring 254 is provided between an inner bottom of the outer casing 251 and a bottom of the pivot member 22 to bias the pivot member 22 upwardly with respect to the outer casing 251.

When the lock pins 252 are fitted in the respective through-holes 251a of the outer casing 251 as illustrated in FIG. 3A the pivot member 22 is in the locked state in which it is locked while protruding upwardly. In this locked state, a top of the pivot member 22 serves as the swing support point of the swing arm 20 (21). Thus, in this locked state, when the cam portion 18a (19a) pushes the cam follower 20a (21a) downwardly, the intake valve 8 (exhaust valve 9) is displaced downwardly against the biasing force of the return spring 16 (17) and opened. During the all-cylinder operation in which all of the four cylinders 2A to 2D are activated, the pivot member 22 is set in the locked state to allow the intake valve 8 (exhaust valve 9) in each of the first and fourth cylinders 2A to be opened and closed.

On the other hand, when the lock pins 252 are pushed oppositely in a radially inward direction of the outer casing 251, the lock pins 252 are moved in a direction causing them to come closer to each other (in the radially inward direction of the outer casing 251) against a biasing force of the lock spring 253. Thus, the fitting between corresponding ones of the lock pins 252 and the through-holes 251*a* of the outer casing 251 is released, and the pivot member 22 is set in the unlocked state in which it can be axially movable.

In the unlocked state, the pivot member 22 is pushed downwardly against a biasing force of the lost motion spring 254. Therefore, it becomes possible to realize a valve deactivation state as illustrated in FIG. 3C. Specifically, the biasing force of the return spring 16 (17) biasing the intake valve 8 (exhaust valve 9) upwardly is set to be greater than that of the lost motion spring 254 biasing the pivot member 22 upwardly. Thus, in the unlocked state, when the cam portion 18*a* (19*a*) pushes the cam follower 20*a* (21*a*) downwardly, a top of the intake valve 8 (exhaust valve 9) serves as the swing support point of the swing arm 20 (21). Therefore, the pivot member 22 is displaced downwardly against the biasing force of the lost motion spring 254. In this process, the intake valve 8 (exhaust valve 9) is kept in the closed state. During the reduced-cylinder operation in which the first and fourth cylinders 2A, 2D are deactivated, the pivot member 22 is set in the unlocked state. Thus, the opening-closing movement of the intake valve 8 (exhaust valve 9) in each of the first and fourth cylinders 2A, 2D is kept in the closed state.

The valve deactivation mechanism 25*a* is a hydraulically-driven type, i.e. the valve deactivation mechanism 25*a*, more specifically, each of the lock pins 252 of the valve deactivation mechanism 25*a*, is driven by oil pressure. Each of the lock pins 252 are configured to be moved in and out with respect to a corresponding one of the through-holes 251*a*, in response to oil pressure supplied thereto, to thereby establish or release the fitting between corresponding ones of the lock pins 252 and the through-holes 251*a* of the outer casing 251.

Figure 4:
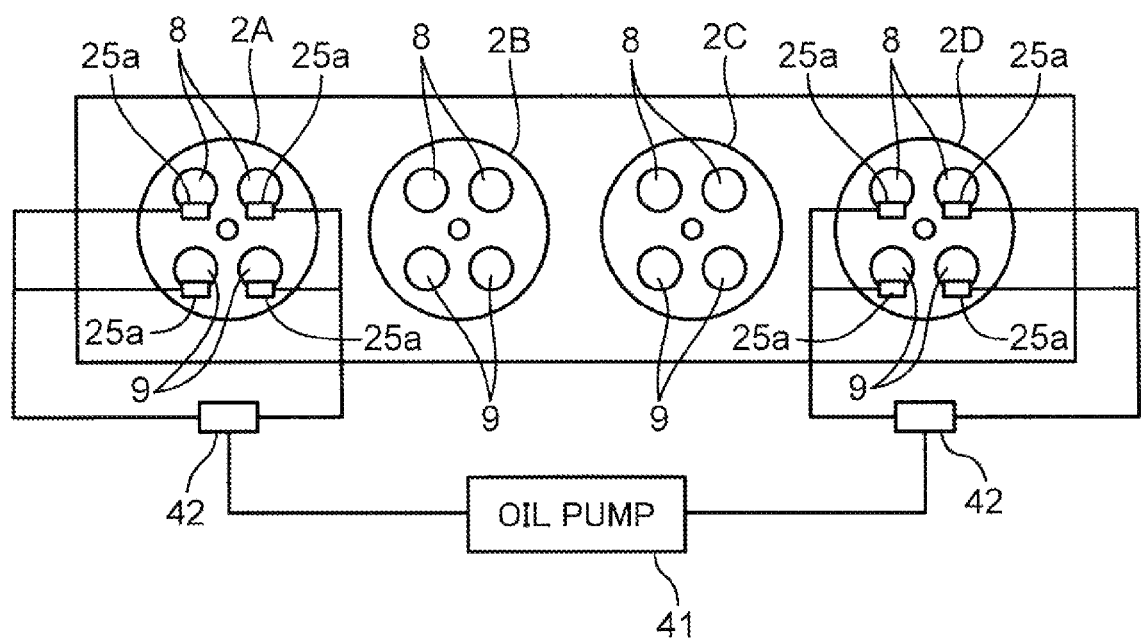
FIG. 4 is a schematic diagram illustrating a pathway of hydraulic oil for the valve stopping mechanism.

As illustrated in FIG. 4, hydraulic oil is supplied from an oil pump 41 to the valve deactivation mechanism 25*a*. A solenoid valve 42 is provided in an oil passage between the oil pump 41 and the valve deactivation mechanism 25*a*. The solenoid valve 42 is operable to change a level of oil pressure to be supplied from the oil pump 41 to the valve deactivation mechanism 25*a*. Specifically, in a state in which the solenoid valve 42 is not energized, i.e., in an OFF state of the solenoid valve 42, the oil passage between the oil pump 41 and the valve deactivation mechanism 25*a* is closed by the solenoid valve 42, and thereby the oil pressure is set to a low level. Accordingly, the lock pins 252 are fitted into the respective through-holes 251*a* of the outer casing 251, so that the intake valve 8 (exhaust valve 9) becomes openable and closable.

On the other hand, in a state in which the solenoid valve 42 is energized, i.e., in an ON state of the solenoid valve 42, the oil passage between the oil pump 41 and the valve deactivation mechanism 25*a* is opened. Accordingly, the fitting between corresponding ones of the lock pins 252 and the through-holes 251*a* of the outer casing 251 is released, so that the intake valve 8 (exhaust valve 9) is kept in the closed state.

In this embodiment, the valve-deactivation solenoid valve 42 is provided in a number of one per cylinder, i.e. in a number of two in total. Specifically, one of the two valve-deactivation solenoid valves 42 is operable to simultaneously change respective levels of oil pressure to be supplied to the valve deactivation mechanism 25*a* associated with the intake valve 8 of the first cylinder 2A and the valve deactivation mechanism 25*a* associated with the exhaust valve 9 of the first cylinder 2A. The other valve-deactivation solenoid valve 42 is operable to simultaneously change respective levels of oil pressure to be supplied to the valve deactivation mechanism 25*a* associated with the intake valve 8 of the fourth cylinder 2D and the valve deactivation mechanism 25*a* associated with the exhaust valve 9 of the fourth cylinder 2D.

(3) Control System

Figure 5:
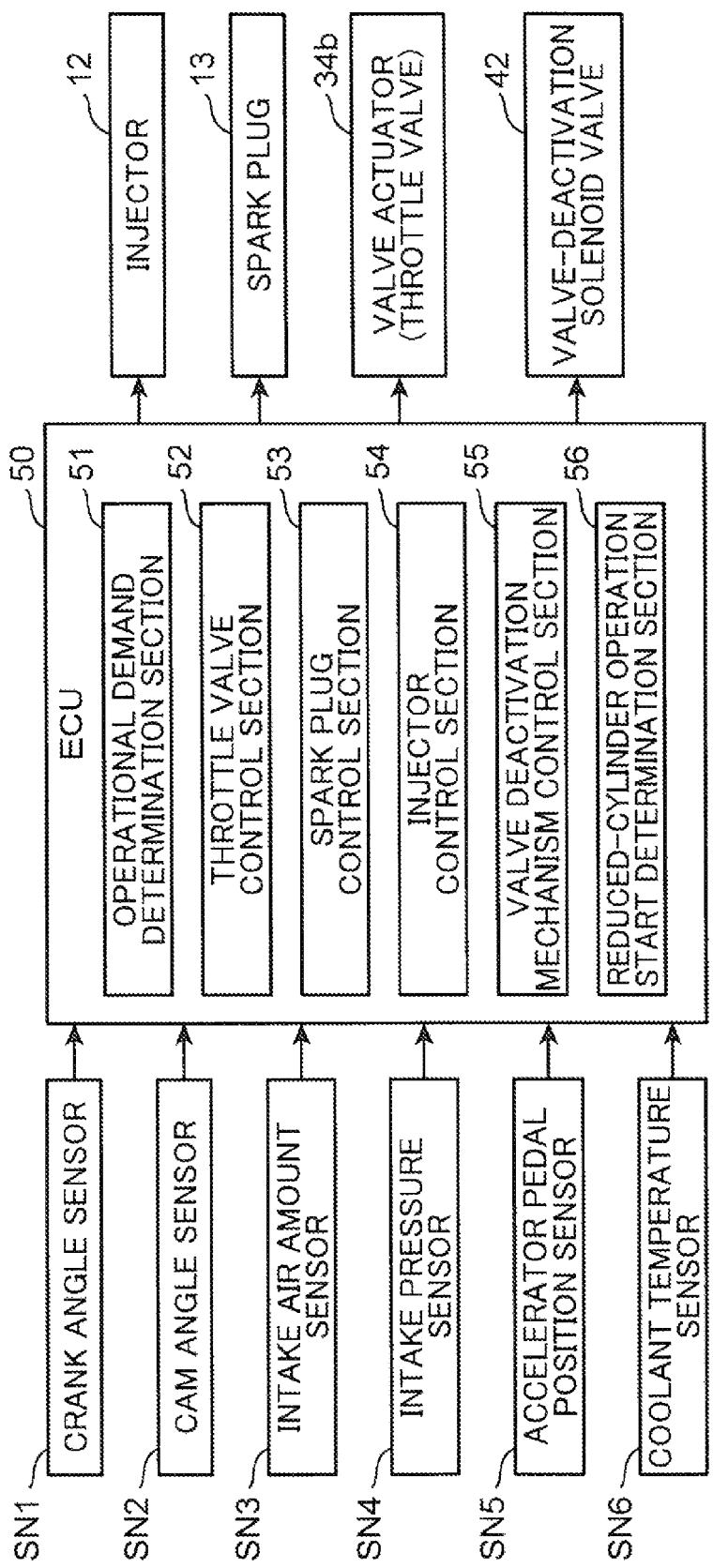
FIG. 5 is a block diagram illustrating an engine control system.

A control system of the engine will be described below. The engine in this embodiment is configured such that a plurality of target devices of the engine are comprehensively controlled by an ECU (Engine Control Unit, control device) 50 illustrated in FIG. 5. As is well known, the ECU 50 is a microprocessor comprising a CPU, a ROM and a RAM.

A plurality of sensors are provided in the engine and other vehicle components to detect respective state quantities at a plurality of positions thereof. Information from the sensors is input into the ECU 50.

For example, the cylinder block 3 is provided with a crank angle sensor SN1 for detecting a rotational angle (crank angle) and a rotational speed of the crankshaft 15. The crank angle sensor SN1 is operable to output a pulse signal according to rotation of a non-illustrated crank plate rotatable together with the crankshaft 15, wherein, based on the pulse signal, it is possible to identify the rotational angle of the crankshaft 15, and the rotational speed of the crankshaft 15, i.e., an engine speed.

The cylinder head 4 is provided with a cam angle sensor SN2. The cam angle sensor SN2 is operable to output a pulse signal according to passing of teeth of a signal plate rotatable together with the camshaft (18 or 19), wherein, based on this pulse signal and the pulse signal from the crank angle sensor SN1, it is possible to identify cylinder discrimination information indicative of in which of strokes of the combustion cycle each of the cylinders is.

The surge tank 32 of the intake passage 30 is provided with an intake air amount sensor SN3 for detecting an actual intake air amount which is an amount of air to be introduced into each of the cylinders 2A to 2D after passing through the surge tank 32, and an intake pressure sensor SN4 for detecting an internal pressure of the surge tank 32.

A non-illustrated accelerator pedal to be operated by a driver is provided with an accelerator pedal position sensor SN5 for detecting a degree of depression of an accelerator pedal (accelerator pedal position). Further, an engine cooling system is provided with a coolant temperature sensor SN6 for detecting a temperature of coolant for cooling the engine body 1 (engine coolant temperature).

The ECU 50 is electrically connected to the sensors SN1 to SN6, and is operable, based on signals input from these sensors, to acquire the variety of information (engine speed, cylinder discrimination information, intake air amount, intake pressure, accelerator pedal position and engine coolant temperature).

The ECU 50 is operable to control a plurality of target devices of the engine while performing various determinations, calculations and others, based on input signals from the sensors SN1 to SN6. The ECU 50 is also electrically connected to the injectors 12, the spark plugs 13, the valve actuator 34b (throttle valve 34a), and the valve-deactivation solenoid valves 42 (valve deactivation mechanisms 25a), and is operable to output a control signal to each of these devices, based on results of the calculation and others. In this embodiment, a set of the injector 12 and the spark plug 13 is provided in a number of one per cylinder, i.e., in a number of four in total. However, in FIG. 5, each of a group of the four injectors and a group of the four spark plugs is denoted by one block. Further, in this embodiment, the valve-deactivation solenoid valve 42 is provided in a number of one for the valve deactivation mechanisms 25a of the first cylinder 2A and in a number of one for the valve deactivation mechanisms 25a of the fourth cylinder 2D, i.e., in a number of two in total. However, in FIG. 5, the two valve-deactivation solenoid valves 42 are denoted by one block.

More specific functions of the ECU 50 will be described below. The ECU 50 comprises, as functional elements, an operational demand determination section 51, a throttle valve control section 52, a spark plug control section 53, an injector control section 54, a valve deactivation mechanism control section 55, and a reduced-cylinder operation start determination section 56.

The operational demand determination section 51 is operable, based on engine operation conditions (engine load, engine speed, engine coolant temperature, etc.) identified from the accelerator pedal position sensor SN5, the crank angle sensor SN1, the coolant temperature sensor SN6, etc., to determine which of the reduced-cylinder operation and the all-cylinder should be performed as an operation mode of the engine.

Figure 6:
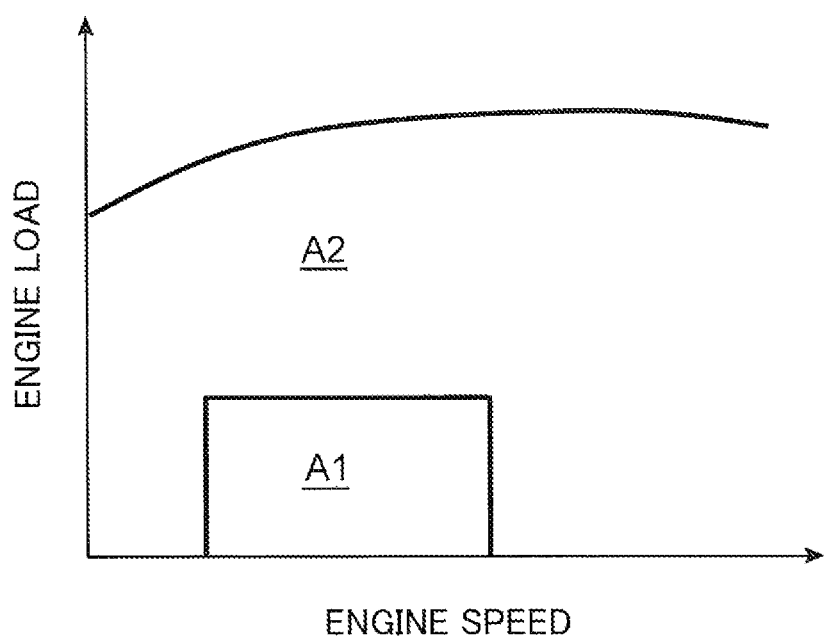
FIG. 6 is a graph illustrating an all-cylinder operation range and a reduced-cylinder operation range.

For example, as illustrated in FIG. 6, when the engine is operated in a specific operating range A1 where the engine load and the engine speed are relatively low, the operational demand determination section 51 determines that there is a demand for the reduced-cylinder operation in which the first and fourth cylinders 2A, 2D are deactivated (only the second and third cylinders 2B, 2C are activated). On the other hand, when the engine load and the engine speed fall within the remaining operating range A2 other than the specific operating range A1, the operational demand determination section 51 determines that there is a demand for the all-cylinder operation in which all of the first to fourth cylinders 2A to 2D are activated. The operational demand determination section 51 is also operable, during a cold start of the engine and during rapid acceleration/deceleration, to determine that the all-cylinder operation should be performed. For example, when the engine coolant temperature detected by the coolant temperature sensor SN6 is equal to or less than a predetermined value, and when a change rate of the accelerator pedal position detected by the accelerator pedal position sensor SN5 is greater than a predetermined value, the operational demand determination section 51 to determine that the all-cylinder operation should be performed.

In this regard, the engine control apparatus according to this embodiment is configured to, even when the operational demand determination section 51 determines that there is a demand for switching from the all-cylinder operation to the reduced-cylinder operation, execute a preparatory control for preparation toward the reduced-cylinder operation, instead of immediately starting the reduced-cylinder operation, and, after completion of the preparatory control, start the reduced-cylinder operation. The reduced-operation start determination section 56 is designed to determine whether the preparatory control should be terminated to start the reduced-cylinder operation, and configured to perform the determination based on the intake air amount or the like. A specific control content of the preparatory control and a specific determination process of the reduced-cylinder operation start determination section 56 will be described later.

The throttle valve control section 52 is operable to control an opening angle of the throttle valve 34a, i.e., the actual intake air amount.

The spark plug control section 53 is operable to control an ignition timing and others of each of the spark plugs 13.

The injector control section 54 is operable to control the injectors 12, and, more specifically, to control an injection amount which is an amount of fuel to be injected from each of the injectors 12 into a corresponding one of the cylinders 2A to 2D (a corresponding one of the combustion chambers 10 of the cylinders) and an injection timing at which the fuel is to be injected.

The valve deactivation mechanism control section 55 is operable to control the valve-deactivation solenoid valves 42 to change the level of oil pressure to be supplied to the valve deactivation mechanisms 25a of the S-HLAs 25, i.e., a state of the opening-closing movements of the intake and exhaust valves 8, 9 of the first and fourth cylinders 2A, 2D.

Details of control contents of the control sections 52 to 56 will be described below.

(4) Control Contents (4-1) Basic Control

Control contents of the control sections during the all-cylinder operation in a normal state, i.e., an engine operating state except for a period during which the preparatory control is executed, and during the reduced-cylinder operation, will be described below.

The throttle valve control section 52 controls the valve actuator 34b to change the opening angle of the throttle valve 34a, so as to attain a preset target torque corresponding to a detection value of the accelerator pedal position sensor SN5, i.e., an amount of depression of the accelerator pedal.

Specifically, based on the target torque, the throttle valve control section 52 calculates a required cylinder charging efficiency which is a charging efficiency required for attaining the target torque. The throttle valve control section 52 calculates a required in-intake passage air amount which is an amount of air in the intake passage 30, required for attaining the required cylinder charging efficiency. Mote specifically, the required in-intake passage air amount is calculated, based on a required cylinder charging efficiency and a reference surge tank volumetric efficiency, preliminarily set according to engine operating conditions (engine speed and others).

Then, based on the required in-intake passage air amount, an actual amount of air in the intake passage 30, and a flow rate of air to be taken into each cylinder through the intake passage 30, the throttle valve control section 52 calculates a required throttle-valve passing flow rate which is a target value of a flow rate of air passing through the throttle valve 34a. Then, base on the required throttle-valve passing flow rate, the throttle valve control section 52 calculates a throttle valve opening angle required for attaining this flow rate (target throttle valve opening angle). Then, the throttle valve control section 52 controls the throttle valve 34a in such a manner as to allow an actual opening angle thereof to become coincident with the target throttle valve opening angle.

For example, the target throttle valve opening angle can be calculated using the Bernoulli's theory. That is, the flow rate of air passing through the throttle valve 34a is determined by the opening angle of the throttle valve 34a and a ratio between pressures on respective upstream and downstream sides of the throttle valve 34a (a ratio of the downstream-side pressure to the upstream-side pressure; hereinafter referred to as "throttle-valve upstream and downstream pressure ratio"). Thus, after detecting pressures on the upstream and downstream sides of the throttle valve 34a by a sensor, the target throttle valve opening angle can be calculated, based on the obtained detection values, and the required throttle-valve passing flow rate. Specifically, the opening angle of the throttle valve 34a, the throttle-valve upstream and downstream pressure ratio and the amount of air passing through the throttle valve 34a are preliminarily measured, and a relationship between respective ones them is stored in the form of a map. Then, a value of the opening angle of the throttle valve 34a corresponding to actually detected values of the throttle-valve upstream and downstream pressure ratio and the required throttle-valve passing flow rate may be extracted from the map, and set as the target throttle valve opening angle. For example, in the case where the amount of air passing through the throttle valve 34a is constant, this map is configured such that, as the throttle-valve upstream and downstream pressure ratio becomes closer to 1, the opening angle of the throttle value 34a becomes larger.

Meanwhile, during the reduced-cylinder operation, the number of activated cylinders capable of generating a power output is reduced. Thus, in order to generate the same engine power output as that during the all-cylinder operation, it is necessary to increase a power output in each of the activated cylinders (second and third cylinders 2B, 2C) to become greater than a power output in each cylinder during the all-cylinder operation. For this reason, during the reduced-cylinder operation, it is necessary to increase a power output (generated torque) per cylinder, and therefore increase the actual intake air amount. Thus, a target value of an intake air amount, i.e., per-cylinder intake air amount, (target intake air amount) during the reduced-cylinder operation is set to be greater than a target value of an intake air amount i.e., per-cylinder intake air amount, (target intake air amount) during the all-cylinder operation. Then, in order to increase the actual intake air amount, it is necessary to set an internal pressure of the intake passage 30 (pressure on the downstream side of the throttle valve 34a) in such a manner as to be higher than that during the all-cylinder operation. As a result, during the reduced-cylinder operation, the throttle-valve upstream and downstream pressure ratio has a value closer to 1 than that during the all-cylinder operation. That is, the opening angle of the throttle valve 34a during the reduced-cylinder operation is controlled to be changed toward its maximum side (fully-open side), with respect to that during the all-cylinder operation.

The spark plug control section 53 switches between two modes of control of the spark plugs 13 of deactivatable cylinders (first and fourth cylinders 2A, 2D), depending on whether the engine is operated in the reduced-cylinder operation or in the all-cylinder operation. During the all-cylinder operation, the spark plug control section 53 performs ignition by driving the spark plugs 13 in all of the cylinders 2A to 2D. On the other hand, during the reduced-cylinder operation, the spark plug control section 53 inhibits driving of the spark plugs 13 of the deactivatable cylinders (first and fourth cylinders 2A, 2D).

When activating the spark plugs 13, the spark plug control section 53 determines ignition timings for the spark plugs 13 according to engine operating conditions, and issues instructions to the respective spark plugs 13.

Specifically, the spark plug control section 53 stores therein a preset map indicative of ignition timing in relation to engine speed and engine load. The spark plug control section 53 extracts an ignition timing corresponding to an actual engine speed and an actual engine load from the map, and subjects the extracted ignition timing to correction based on a detection value of the intake pressure sensor SN4 and others, to determine an ultimate ignition timing. As the ignition timing map, two types consisting of a type for the reduced-cylinder operation and a type for the all-cylinder operation are prepared, and one of the two types corresponding to a desired operation is used.

The injector control section 54 switches between two modes of control for the injectors 12 of the deactivatable cylinders (first and fourth cylinders 2A, 2D), depending on whether the engine is operated in the reduced-cylinder operation or in the all-cylinder operation. During the all-cylinder operation, the injector control section 54 performs fuel injection by driving the injectors 12 in all of the cylinders 2A to 2D. On the other hand, during the reduced-cylinder operation, the injector control section 54 inhibits fuel injection to the deactivatable cylinders (first and fourth cylinders 2A, 2D) so as to stop combustion in the deactivatable cylinders.

When causing the injectors 12 to perform fuel injection, the injector control section 54 determines injection timings for the injectors 12 according to engine operating conditions, and issues instructions to the respective injectors 12.

The valve deactivation mechanism control section 55 controllably switches the valve-deactivation solenoid valve 42, depending on whether the engine is operated in the reduced-cylinder operation or in the all-cylinder operation. During the all-cylinder operation, the valve deactivation mechanism control section 55 controls the solenoid valves 42 to be shifted to the OFF state to thereby allow the opening-closing movement of the intake and exhaust valves 8, 9 in all of the cylinders 2A to 2D. On the other hand, during the reduced-cylinder operation, the valve deactivation mechanism control section 55 controls the solenoid valves 42 to be shifted to the ON state to thereby keep the intake and exhaust valves 8, 9 of the deactivatable cylinders (first and fourth cylinders 2A, 2D) in the closed state.

(4-2) Preparatory Control
(i) Control Content

In the reduced-cylinder operation, the actual intake air amount is increased to allow a power output in each of the activated cylinders to be increased to be greater than that during the all-cylinder operation, as mentioned above. However, due to a delay in change of the actual intake air amount, if, immediately after issuance of a demand for switching from the all-cylinder operation to the reduced-cylinder operation, combustion in the deactivatable cylinders (first and fourth cylinders 2A, 2D) is stopped to start the reduced-cylinder operation, the actual intake air amount in each of the activated cylinders (second and third cylinders 2B, 2C) becomes deficient, leading to a decrease in engine power output. This causes a decrease in a force to be transferred to vehicle wheels, i.e., a vehicle-wheel driving force and thus a change in behavior of the vehicle body, resulting in a risk that a passenger feels a shock. In the following description, the vehicle-wheel driving force or a force to be transmitted from vehicle wheels to a road surface will be referred to as "vehicle wheel-side driving force". The preparatory control is intended to suppress a decrease in the vehicle wheel-side driving force, and is started when the operational demand determination section 51 determines that there is a demand for switching from the all-cylinder operation to the reduced-cylinder operation.

When the operational demand determination section 51 determines that there is a demand for switching from the all-cylinder operation to the reduced-cylinder operation, the throttle valve control section 52 first sets a target value of the intake air amount (per-cylinder intake air amount, charging efficiency) to a transient value which is greater than a target value of the intake air amount (target intake air amount) during the all-cylinder operation in a normal state (in which there is no switching demand). Then, as part of the preparatory control, the throttle valve control section 52 executes a control for changing the opening angle of the throttle valve 34a, in such a manner that an actual intake air amount is increased toward the transient target intake air amount.

In this embodiment, the throttle valve control section 52 sets, as the transient target intake air amount, the target intake air amount during the reduced-cylinder operation, and executes, as part of the preparatory control, the same control as the control during the reduced-cylinder operation as described in the subsection (4-1). Upon the determination that there is the switching demand, the throttle valve control section 52 changes a current opening angle of the throttle valve 34a to an opening angle during the reduced-cylinder operation, i.e., to an opening angle closer to the fully-open side than that during the all-cylinder operation in the normal state. That is, in this embodiment, immediately after the determination that there is the switching demand for switching from the all-cylinder operation and the reduced-cylinder operation, the throttle valve control section 52 starts the throttle valve control during the reduced-cylinder operation.

As part of the preparatory control, the valve deactivation mechanism control section 55 executes the control for switching the valve-deactivation solenoid valves 42 to the OFF state to allow the opening-closing movement of the intake and exhaust valves in all of the cylinders 2A to 2D. That is, even when the operational demand determination section 51 issues the switching demand for switching from the all-cylinder operation to the reduced-cylinder operation, the valve deactivation mechanism control section 55 continues to allow the opening-closing movement of the intake and exhaust valves 8, 9 in all of the cylinders 2A to 2D, without switching the valve-deactivation solenoid valves 42 to the ON state.

As part of the preparatory control, the injector control section 54 and the spark plug control section 53 control, respectively, the injectors 12 and the spark plugs 13 to perform combustion in all of the cylinders 2A to 2D. That is, even when the operational demand determination section 51 issues the switching demand for switching from the all-cylinder operation to the reduced-cylinder operation, the injector control section 54 and the spark plug control section 53 perform, respectively, fuel injection and ignition in all of the cylinders 2A to 2D, without stopping fuel injection and ignition in the deactivatable cylinders (first and fourth cylinders 2A, 2D).

As above, in this apparatus, even when the operational demand determination section 51 issues the switching demand for switching from the all-cylinder operation to the reduced-cylinder operation, the preparatory control is executed to openably and closably drive the intake and exhaust valves 8, 9 in all of the cylinders 2A to 2D and perform combustion in all of the cylinders 2A to 2D.

Further, in the preparatory control, the throttle valve control section 52 operates to increase the actual intake air amount to be greater than the target intake air amount during the all-cylinder operation in the normal state. Therefore, if combustion performed in all of the cylinders 2A to 2D under the condition that the actual intake air amount is relatively large, the engine power output (engine torque) becomes greater than an engine power output requested from a driver or the like, during the all-cylinder operation in the normal state, i.e., just before start of the preparatory control.

For this reason, in this apparatus, during the preparatory control, the ignition timing is retarded to a point at which it becomes possible to suppress an increase in engine power output which would otherwise be caused by the increase in actual intake air amount. During the preparatory control, the spark plug control section 53 controls the ignition timing to be shifted toward a retard side with respect to an ignition timing during the all-cylinder operation in the normal state, i.e., just before start of the preparatory control.

Specifically, the spark plug control section 53 calculates how much the actual intake air amount is increased with respect to the target intake air amount during the all-cylinder operation in the normal state, and calculates a retard amount corresponding to the calculated increment in intake air amount, specifically, an increment in engine power output (engine torque) corresponding to the calculated increment in intake air amount. In this embodiment, the spark plug control section 53 stores therein a map indicative of an increment in intake air amount and a retard amount predetermined in relation to engine operating conditions (engine speed, engine load, etc.), and a retard amount corresponding to a calculated increment in intake air amount and actual engine operating conditions is extracted from the map. Then, the spark plug control section 53 determines, as an ignition timing for the preparatory control, a point set by retarding, by the calculated retard amount, a basic ignition timing during the all-cylinder operation in the normal state, determined along the process described in the subsection (4-1).

(ii) Timing of Termination of Preparatory Control and Start of Reduced-Cylinder Operation The preparatory control is executed until the reduced-cylinder operation start determination section 56 determines that the preparatory control should be terminated to start the reduced-cylinder operation.

In this embodiment, at a time when a difference between an actual intake air amount and the target intake air amount during the reduced-cylinder operation, i.e., a deficiency in intake air amount with respect to the target intake air amount during the reduced-cylinder operation becomes equal to or less than a predetermined allowable deficient intake air amount, the reduced-cylinder operation start determination section 56 determines that the preparatory control should be terminated to start the reduced-cylinder operation.

As above, the preparatory control is intended to suppress a change (decrease) in the vehicle wheel-side driving force which would otherwise be caused by a change (decrease) in engine power output occurring during the switching from the all-cylinder operation to the reduced-cylinder operation. Thus, the allowable deficient intake air amount is set such that an amount of fluctuation in vehicle wheel-side driving force can be suppressed to a given value or less, even in a situation where the reduced-cylinder operation is started at a time when the actual intake air amount is deficient by the allowable deficient intake air amount. In this embodiment, the amount of fluctuation in vehicle wheel-side driving force at start of the reduced-cylinder operation is set to a value which allows a passenger to be almost kept from feeling a shock (this value will hereinafter be referred to occasionally as "allowable change amount of vehicle wheel-side driving force" or "allowable driving-force change amount").

As used herein, the term "vehicle wheel-side driving force" means a value obtained by multiplying an engine power output by a speed reduction ratio. Thus, the amount of fluctuation in vehicle wheel-side driving force with respect to an amount of fluctuation in engine power output becomes smaller, in a high speed stage having a relative low speed reduction ratio, as compared to a low speed stage having a relative high speed reduction ratio. Therefore, in the high speed stage, even when a deficiency in intake air amount with respect to the target intake air amount during the reduced-cylinder operation is relatively large and thereby the amount of fluctuation in engine power output at start of the reduced-cylinder operation becomes relatively large, the amount of fluctuation in vehicle wheel-side driving force, i.e., a shock felt by a passenger, is suppressed to a low level.

For this reason, in the high speed stage having a relatively low speed reduction ratio, the allowable deficient intake air amount is set to a larger value than that in the control in the low speed stage having a relatively high speed reduction ratio.

Figure 7:
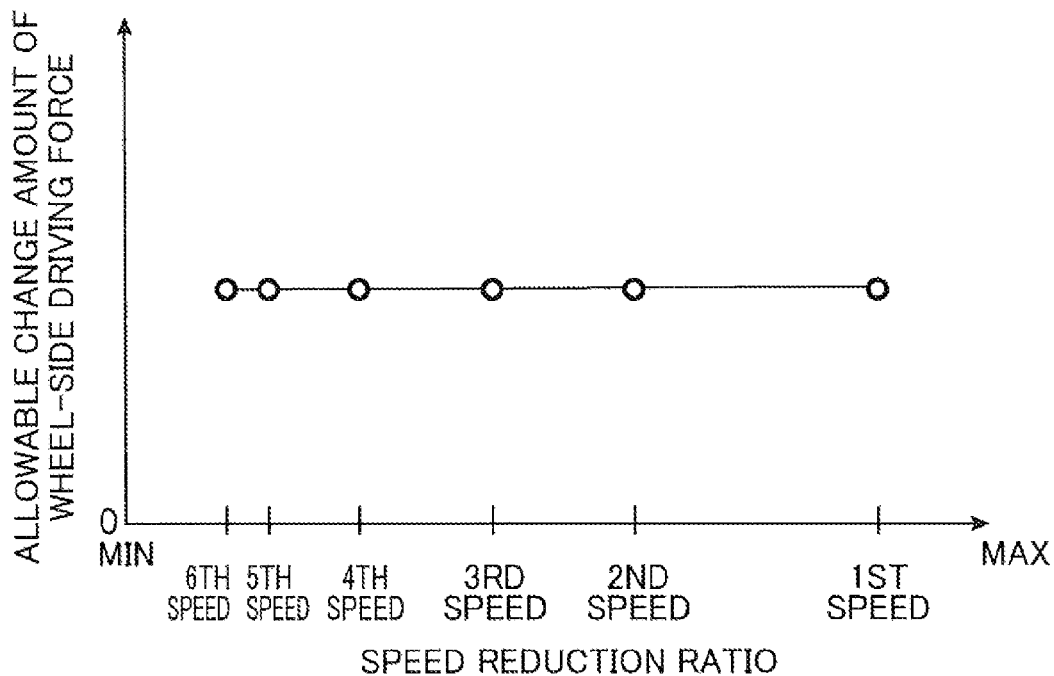
FIG. 7 is a graph illustrating one example of a relationship between speed reduction ratio and allowable change amount of vehicle wheel-side driving force.

In this embodiment, values of the allowable deficient intake air amount at a plurality of speed stages are set such that the amount of fluctuation in vehicle wheel-side driving force occurring at start of the reduced-cylinder operation becomes the aforementioned allowable driving-force change amount set to become the same in value, irrespective of speed reduction ratio (speed stage), as illustrated in FIG. 7. That is, the allowable deficient intake air amount is set to a value which varies inversely with respect to the speed reduction ratio and becomes larger as the speed stage is a higher speed stage configured to provide a higher output speed.

Specifically, the reduced-cylinder operation start determination section 56 first detects a current speed stage. Specifically, based on a vehicle speed detected by a vehicle speed sensor, and an engine speed detected by an engine speed sensor, the reduced-cylinder operation start determination section 56 calculates (detects) the current speed stage. Then, the reduced-cylinder operation start determination section 56 determines the allowable deficient intake air amount according to the detected speed stage. In this embodiment, the reduced-cylinder operation start determination section 56 stores therein values of the allowable deficient intake air amount predetermined according to a plurality of speed stages, and extracts one of the values corresponding to the current speed stage (detected at the time of the determination that there is the demand for switching from the all-cylinder operation to the reduced-cylinder operation).

Then, at a time when the difference between the actual intake air amount and the target intake air amount during the reduced-cylinder operation becomes equal to or less than the allowable deficient intake air amount after start of the preparatory control, i.e., when the actual intake air amount is increased to a value which is obtainable by subtracting the allowable deficient intake air amount from the target intake air amount during the reduced-cylinder operation, the reduced-cylinder operation start determination section 56 determines that the preparatory control should be terminated to start the reduced-cylinder operation, as mentioned above. In this embodiment, the reduced-cylinder operation start determination section 56 performs this determination, based on a detection value of the intake air amount sensor SN3.

(iii) Flow of Preparatory Control

Figure 9:
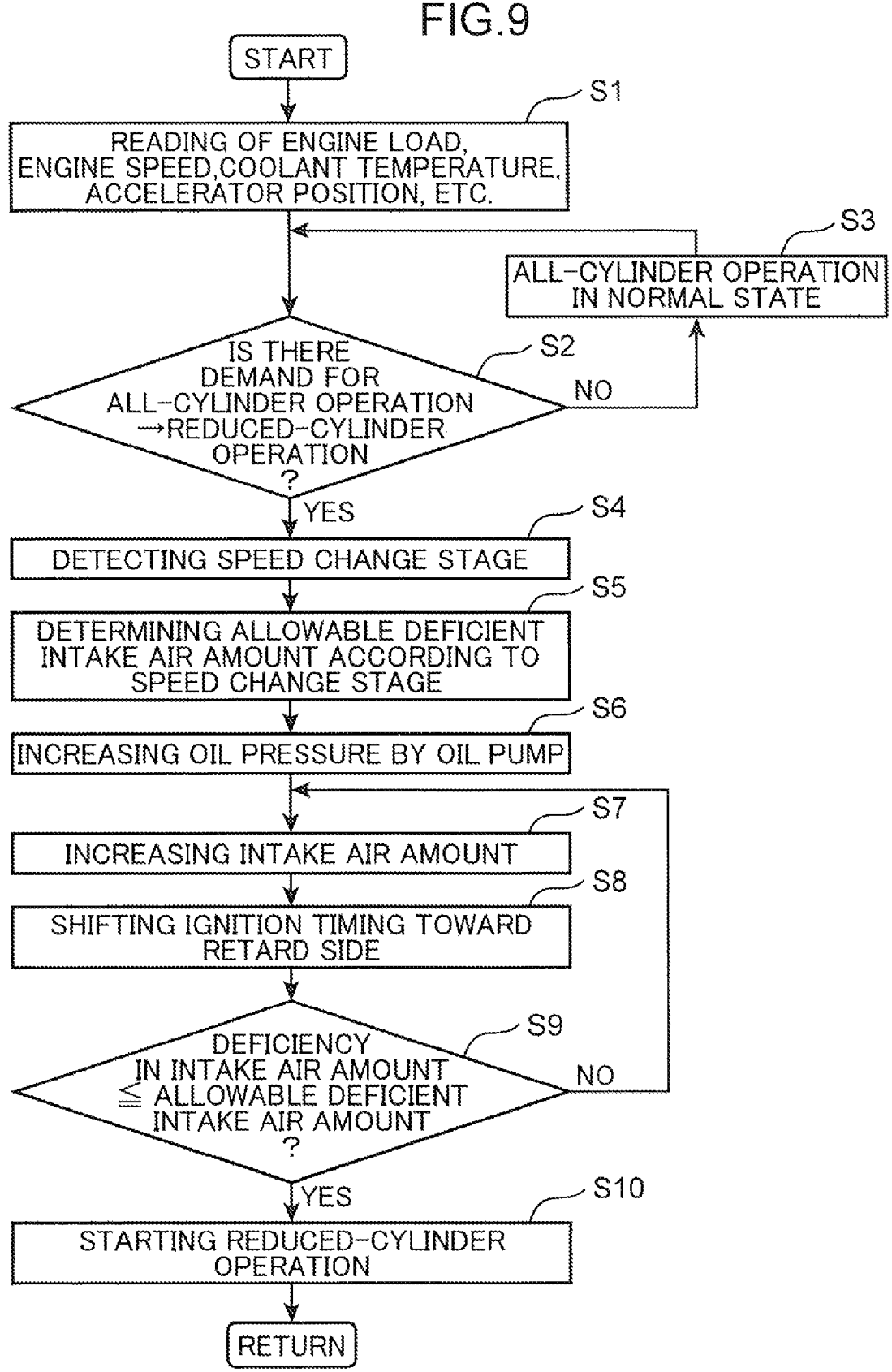
FIG. 9 is a flowchart illustrating a control process during switching from an all-cylinder operation to a reduced-cylinder operation.

With reference to the flowchart in FIG. 9, a flow of the preparatory control to be executed by the ECU 50 will be described.

First of all, in Step S1, reading of the engine load, the engine speed, the engine coolant temperature (coolant temperature), the accelerator position and others, identified by detection values of the above sensors, is performed. Then, in Step S2, it is determined whether or not there is the demand for switching from the all-cylinder operation to the reduced-cylinder operation. As mentioned above, this determination is performed by the operational demand determination section 51, wherein whether or not there is the demand for switching from the all-cylinder operation to the reduced-cylinder operation is determined based on whether or not the engine coolant temperature is equal to or greater than a given value, and whether or not a rate of change in accelerator pedal position is equal to or greater than a given value.

When the determination in the Step S2 is made as NO, i.e., it is determined that there is no demand for switching from the all-cylinder operation to the reduced-cylinder operation (shifting from the all-cylinder operation to the reduced-cylinder operation should not be performed), the routine proceeds to Step S3, and, in the Step S3, the all-cylinder operation in the normal state is maintained. On the other hand, when the determination in the Step S2 is made as YES, i.e., it is determined that there is the demand for switching from the all-cylinder operation to the reduced-cylinder operation, the routine proceeds to Step S4.

In the Step S4, a current speed stage (at the time of the determination that there is the demand for switching from the all-cylinder operation to the reduced-cylinder operation) is detected. As mentioned above, the reduced-cylinder operation start determination section 56 calculates (detects) the current speed stage based on an actual vehicle speed and an actual engine speed.

In Step S5 following the Step S4, the allowable deficient intake air amount is determined. As mentioned above, the reduced-cylinder operation start determination section 56 determines the allowable deficient intake air amount according to the speed stage detected in the Step S4.

In Step S6 following the Step S5, the oil pump 41 increases an oil pressure in an oil passage between the oil pump 41 and each of the valve deactivation mechanisms 25a, more specifically, in an oil passage between the oil pump 41 and each of the valve-deactivation solenoid valves 42. This is intended to more reliably keep the intake and exhaust valves 8, 9 of the deactivatable cylinders (first and fourth cylinders 2A, 2D) in the closed state, at start of the reduced-cylinder operation. As above, the oil passage between the oil pump 41 and each of the valve-deactivation solenoid valves 42 is increased at start of the reduced-cylinder operation. However, each of the valve-deactivation solenoid valves 42 is in the OFF state, at this time, so that the lock pins 252 and the through-holes 251a of each of the valve deactivation mechanisms 25a are maintained in the fitting released (non-fitted) state to allow the opening-closing movement of the intake and exhaust valves 8, 9 of the deactivatable cylinders (first and fourth cylinders 2A, 2D).

In Step S7 following the Step S6, the actual intake air amount is increased. In this embodiment, the throttle valve control section 52 sets a target value of the intake air amount for the preparatory control, to the target intake air amount during the reduced-cylinder operation, which is greater than the target intake air amount during the all-cylinder operation in the normal state, to thereby change a current opening angle of the throttle valve 34a to an opening angle during the reduced-cylinder operation, which is closer to the fully-open side than that during the all-cylinder operation in the normal state, so that the actual intake air amount is increased, as mentioned above.

In Step S8 following the Step S7, the ignition timing is shifted toward the retard side with respect to that during the all-cylinder operation in the normal state. In this embodiment, the spark plug control section 53 sets an ignition timing for the preparatory control to a point set by retarding the ignition timing during the all-cylinder operation in the normal state, by an amount corresponding to an increment in intake air amount, from the all-cylinder operation in the normal state (after start of the preparatory control), as mentioned above.

In Step S9 following the Step S8, it is determined whether or not a difference between the target intake air amount during the reduced-cylinder operation and the actual intake air amount becomes equal to or greater than the allowable deficient intake air amount, i.e., whether or not the actual intake air amount is increased to a value which is obtainable by subtracting the allowable deficient intake air amount from the target intake air amount during the reduced-cylinder operation. When the determination in the Step S9 is made as YES, the routine proceeds to Step S10. On the other hand, when the determination in the Step S9 is made as NO, and a deficiency in intake air amount with respect to the target intake air amount during the reduced-cylinder operation is still greater than the allowable deficient intake air amount, the routine returns to the Step S7, and the process from the Steps S7 to S9 is repeated.

In the Step S10, the reduced-cylinder operation is started. That is, ignition and fuel injection in the deactivatable cylinders (first and fourth cylinders 2A, 2D) are stopped. Further, the valve-deactivation solenoid valves 42 are switched to the ON state to keep the intake and exhaust valves 8, 9 of the deactivatable cylinders (first and fourth cylinders 2A, 2D) in the closed state, and the ignition control in the activated cylinders (second and third cylinders 2B, 2C) is switched to a normal control during the reduced-cylinder operation.

(5) Functions, Etc.

Figure 10:
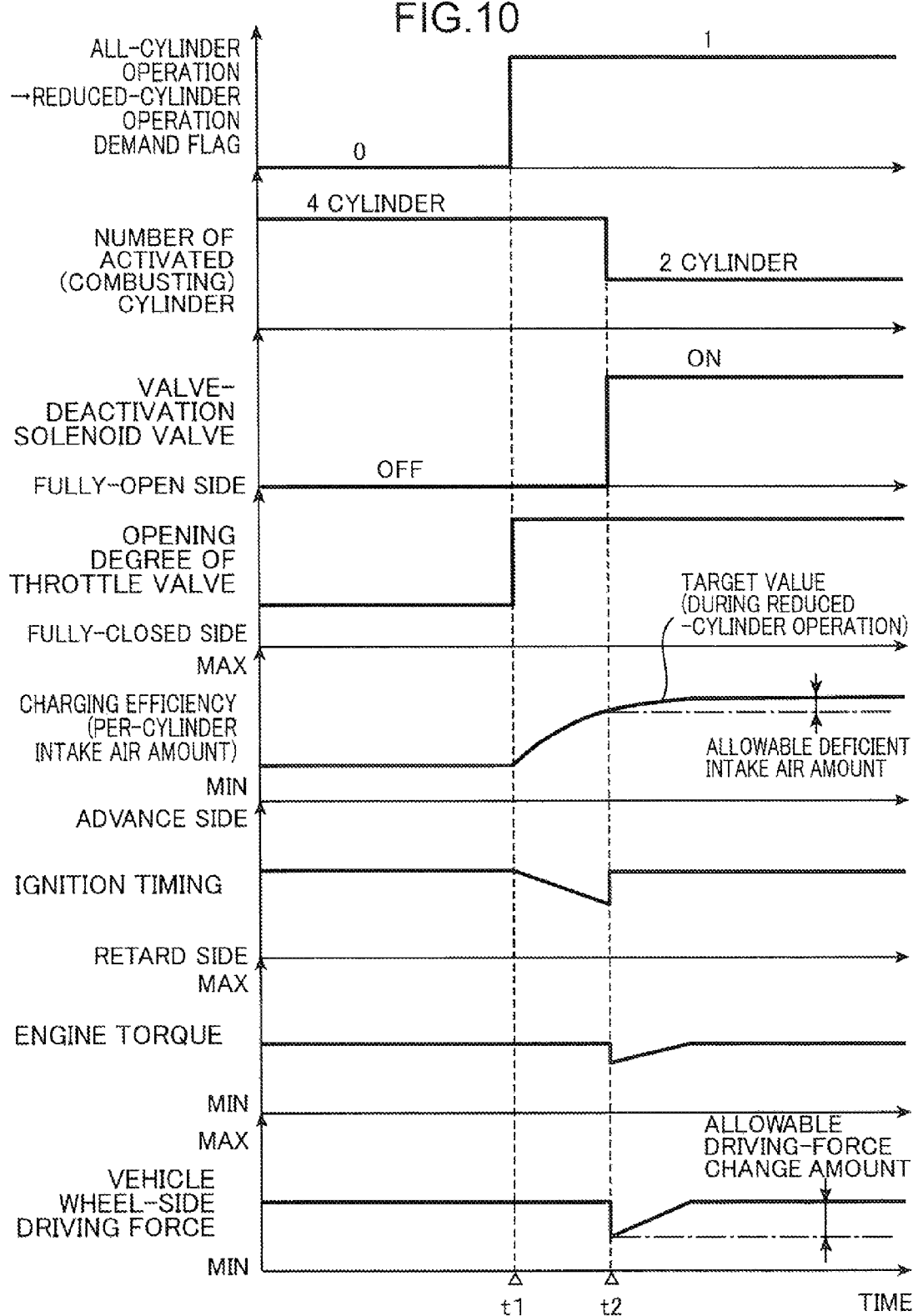
FIG. 10 is a time chart illustrating a temporal change in each parameter measured when control by the engine control apparatus according to this embodiment is executed in a low speed stage.
Figure 11:
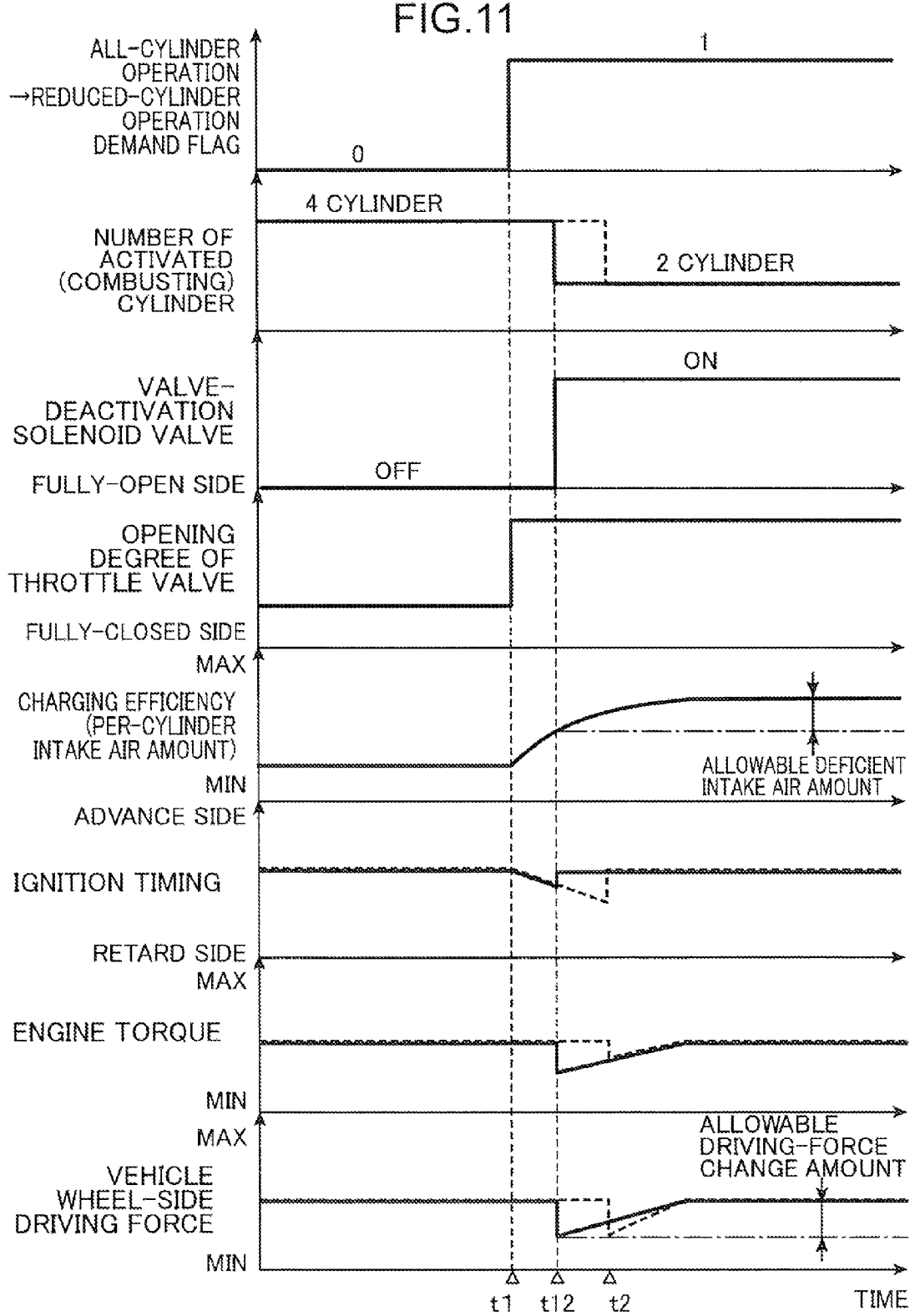
FIG. 11 is a time chart illustrating a temporal change in each parameter measured when the control by the engine control apparatus according to this embodiment is executed in a high speed stage.

FIGS. 10 and 11 illustrate a change of each parameter during switching from the all-cylinder operation to the reduced-cylinder operation in this embodiment. FIG. 10 presents a result of switching from the all-cylinder operation to the reduced-cylinder operation in the low speed stage (e.g., 2nd speed stage). FIG. 11 presents a result of switching from the all-cylinder operation to the reduced-cylinder operation in the high speed stage (e.g., 5th speed stage). In FIGS. 10 and 11, the uppermost graph presents a flag for switching from the all-cylinder operation to the reduced-cylinder operation, wherein, when the switching demand for switching from the all-cylinder operation to the reduced-cylinder operation is issued, the flag is changed from 0 to 1.

As illustrated in FIG. 10, in this embodiment, even when the switching demand for switching from the all-cylinder operation to the reduced-cylinder operation is issued at time t1, the number of the activated (combusting) cylinders is set to 4 (all cylinders), and the valve-deactivation solenoid valves 42 are maintained in the OFF state, without immediately starting the reduced-cylinder operation. Further, at the time t1, the preparatory control is executed, so that the throttle valve 34a is shifted toward the fully-open side to thereby increase the actual intake air amount (per-cylinder intake air amount, charging efficiency), and the ignition timing is retarded in proportion to an increment in the intake air amount.

In this embodiment, the actual intake air amount is increased while the ignition timing is retarded, so that the intake air amount can be increased without causing an increase (fluctuation) in engine power output after the time t1.

When the actual intake air amount becomes larger, i.e., a difference from the transient target intake air amount, i.e., the target intake air amount during the reduced-cylinder operation, becomes less than the allowable deficient intake air amount (at time t2), the reduced-cylinder operation is started. That is, at the time t2, the number of the activated (combusting) cylinders is reduced to two. Further, the valve-deactivation solenoid valves 42 are switched to the ON state, and the ignition timing is returned to a normal timing.

At the time t2, the actual intake air amount is still deficient by the allowable deficient intake air amount, with respect to the target intake air amount during the reduced-cylinder operation. Thus, when the reduced-cylinder operation is started in this state, the engine power output is reduced by an amount corresponding to the deficiency in intake air amount (allowable deficient intake air amount).

However, the allowable deficient intake air amount is set such that the amount of fluctuation in vehicle wheel-side driving force becomes equivalent to the allowable driving-force change amount which allows a passenger to be almost kept from feeling a shock, even when the reduced-cylinder operation is started in the situation where the actual intake air amount is deficient by the allowable deficient intake air amount, with respect to the target intake air amount during the reduced-cylinder operation, as mentioned above. Therefore, in this embodiment, it becomes possible to start the reduced-cylinder operation without causing a passenger to feel a shock.

As illustrated in FIG. 11, even in the case where the current speed stage is in the high speed stage, when the demand for switching from the all-cylinder operation to the reduced-cylinder operation is issued at the time t1, the preparatory control is executed, so that the actual intake air amount is increased after the time t1 without causing an increase (fluctuation) in engine power output, as with the case where the current speed stage is the low speed stage as illustrated in FIG. 10. Then, when a difference between the actual intake air amount and the target intake air amount during the reduced-cylinder operation becomes less than the allowable deficient intake air amount, the reduced-cylinder operation is started.

In this embodiment, the allowable deficient intake air amount is set to a larger value as the current speed stage is a higher speed stage, as mentioned above. Thus, in the high speed stage illustrated in FIG. 11, the reduced-cylinder operation is started even at a time when the actual intake air amount is increased by only a relatively small value. Thus, time t12 when the reduced-cylinder operation is started in the high speed stage is earlier than the time t2 when the reduced-cylinder operation is started in the low speed stage.

As above, in the high speed stage, the reduced-cylinder operation is started at a time when an increment in intake air amount is relatively small, and the deficiency with respect to the target intake air amount during the reduced-cylinder operation. Therefore, an amount of decrease in engine power output at start of the reduced-cylinder operation becomes larger than that in the control in the low speed stage. However, the speed reduction rate is relatively small in the high speed stage, as mentioned above, so that a difference between the low and high speed stages in terms of an amount of decrease in vehicle wheel-side driving force becomes smaller than a difference therebetween in terms of an amount of decrease in engine power output. In this embodiment, values of the allowable deficient intake air amount at a plurality of speed stages are set such that the amount of fluctuation in vehicle wheel-side driving force at start of the reduced-cylinder operation becomes equivalent to the allowable driving-force change amount which is maintained at the same value, irrespective of the speed reduction ratios (speed stages), as mentioned above. Therefore, while the amount of decrease in engine power output varies depending on whether the current speed stage is the high speed stage or the low speed stage, the amount of fluctuation in vehicle wheel-side driving force is kept at the same value.

As above, the engine control apparatus according to this embodiment makes it possible to, during switching from the all-cylinder operation to the reduced-cylinder operation, increase the actual intake air amount without causing an increase (fluctuation) in engine power output, and more start the reduced-cylinder operation on the side of the high speed stage at an earlier stage, while suppressing the amount of fluctuation in vehicle wheel-side driving force, i.e., a shock to be felt by a passenger. Therefore, it becomes possible to ensure an execution time for the reduced-cylinder operation to provide enhanced fuel efficiency while providing good riding comfort.

(6) Modifications

Although the above embodiment has been described based on an example where the preparatory control is executed in all of the speed stages, the preparatory control may be omitted in a part of the speed stages on the side of the high speed stage.

Specifically, in the case where the allowable deficient intake air amount can be increased, in the high speed stage, to a value greater than a difference between an actual intake air amount during the all-cylinder operation, and the target intake air amount during the reduced-cylinder operation used as a transient target value upon issuance of the demand for switching to the reduced-cylinder operation, the amount of fluctuation in vehicle wheel-side driving force at start of the reduced-cylinder operation can be suppressed to a given value or less, without increasing the actual intake air amount before start of the reduced-cylinder operation. Thus, in a part of the speed stages on the side of the high speed stage, the reduced-cylinder operation may be started immediately after issuance of the demand for switching from the all-cylinder operation to the reduced-cylinder operation, without executing the preparatory control, and the preparatory control may be executed only in a part of the speed stages on the side of the low speed stage. Whether or not the allowable deficient intake air amount can be increased to a value greater than a difference between an actual intake air amount during the all-cylinder operation and the target intake air amount during the reduced-cylinder operation can be preliminarily ascertained by experiment or the like. Thus, in this case, the ECU mounted to the vehicle body may be configured to determine whether or not the current speed stage is a lower speed stage configured to provide a lower output speed than that of a predetermined reference speed stage, and execute the preparatory control only when it is the lower speed stage.

Figure 8:
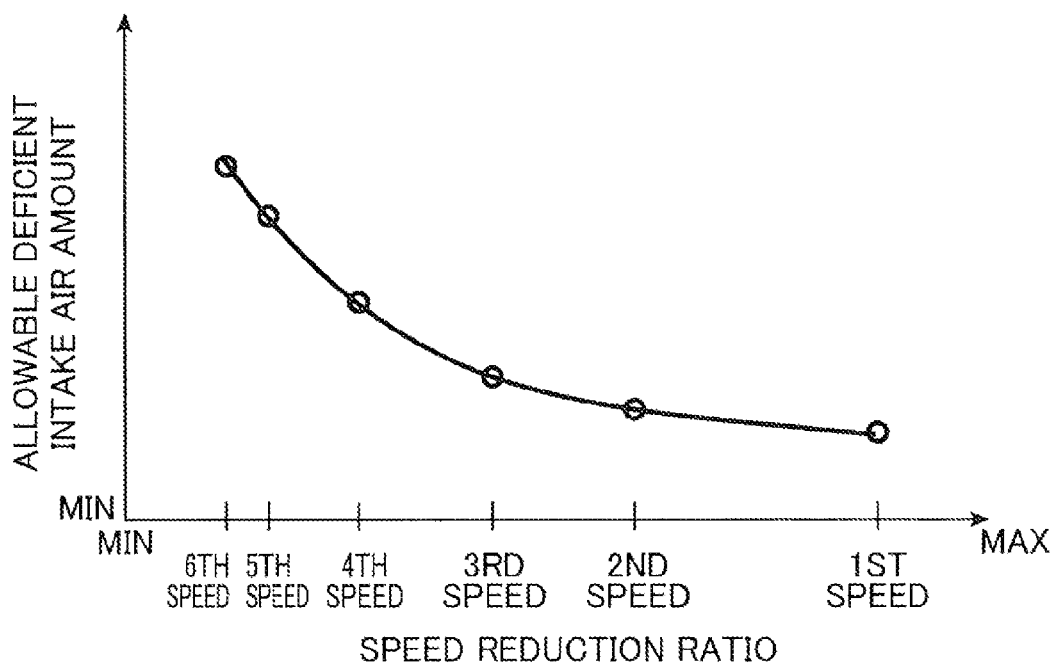
FIG. 8 is a graph illustrating one example of a relationship between speed reduction ratio and allowable deficient intake air amount.
Figure 12:
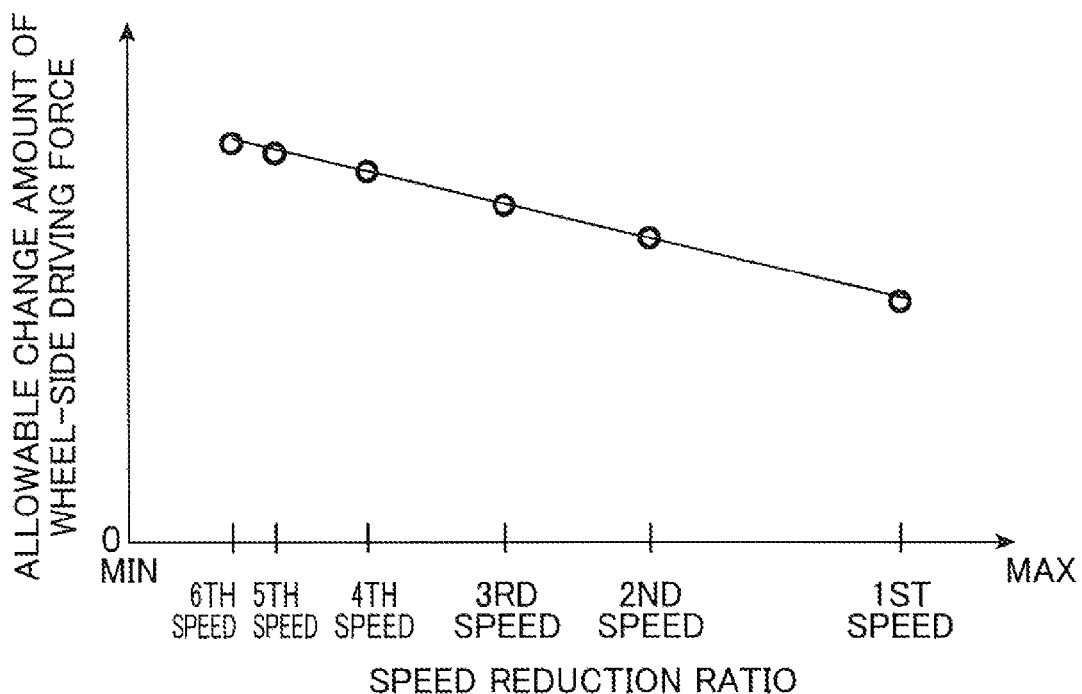
FIG. 12 is a graph illustrating another example of the relationship between speed reduction ratio and allowable change amount of vehicle wheel-side driving force.
Figure 13:
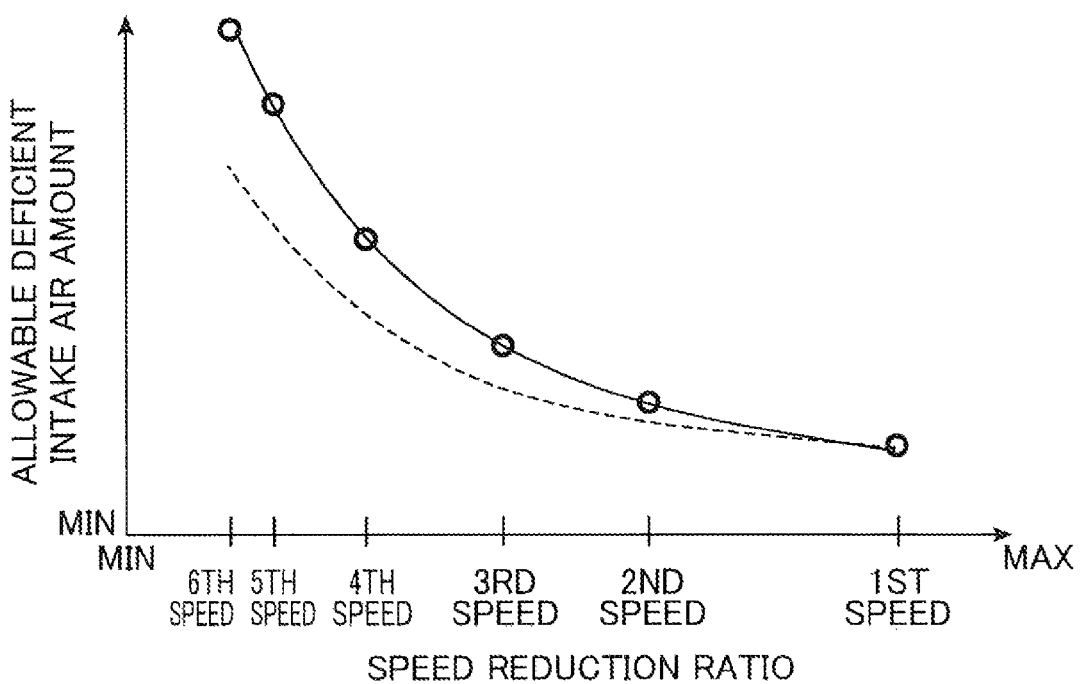
FIG. 13 is a graph illustrating another example of the relationship between speed reduction ratio and allowable deficient intake air amount.

Although the above embodiment has been described based on an example where the allowable deficient intake air amounts in the respective speed stages are set such that the amount of fluctuation in vehicle wheel-side driving force is kept at the same value, irrespective of the speed stages, the allowable deficient intake air amount setting process is not limited thereto. For example, it is considered that a passenger becomes less likely to feel the amount of fluctuation in vehicle wheel-side driving force, in the high stage. Thus, as illustrated in FIG. 12, the allowable driving-force change amount (allowable change amount of vehicle wheel-side driving force), i.e., an allowable value of the amount of fluctuation in vehicle wheel-side driving force, is set to become larger as the current speed stage is a higher speed stage (having a lower speed reduction ratio). Accordingly, as illustrated in FIG. 13, the allowable deficient intake air amount is set to become larger as the current speed stage is a higher speed stage, comparing to the case illustrated in FIG. 8 (the broken line in FIG. 13).

Further, the allowable deficient intake air amount may be set to become the same value for adjacent two or more of the speed stages. For example, the allowable deficient intake air amount may be set such that the same value is assigned to the 1st and 2n speed stages, and a value greater than that to the 1st and 2n speed stages is assigned to each of the remaining speed stages.

Although the above embodiment has been described based on an example where the determination as to whether or not the preparatory control should be terminated to start the reduced-cylinder operation, i.e., the determination as to whether or not the deficiency in intake air amount with respect to the target intake air amount during the reduced-cylinder operation becomes equal to or less than the predetermined allowable deficient intake air amount, is performed based on a detection value of the intake air amount sensor SN3, a specific process for this determination is not limited thereto. For example, the following process may be employed. A time period after start of the preparatory control in each of the speed stages through until the a deficiency in intake air amount with respect to the target intake air amount during the reduced-cylinder operation becomes equal to or less than the predetermined allowable deficient intake air amount is preliminarily detected and determined by experiment or the like, and stored in the ECU (reduced-cylinder operation start determination section 56). Then, the ECU 50 may be configured to determine whether the deficiency in intake air amount with respect to the target intake air amount during the reduced-cylinder operation becomes equal to or less than the predetermined allowable deficient intake air amount, at a time when the time period has elapsed from a time of start of the preparatory control.

Although the above embodiment has been described based on an example where the actual intake air amount is changed by opening and closing of the throttle valve 34a, i.e., in the preparatory control, the throttle valve 34a is shifted toward the filly-open side to increase the actual intake air amount, a device for changing (increasing) the actual intake air amount is not limited thereto. For example, a device capable of changing a valve timing or valve lift of the intake valves 8 may be used to change the valve timing or valve lift of the intake valves 8 to thereby change (increase) the actual intake air amount.

Although the above embodiment has been described based on an example where the control apparatus of the present invention is applied to a four-cylinder gasoline engine, a type of engine to which the control apparatus of the present invention is applicable is not limited thereto. For example, the control apparatus of the present invention may be applied to any multi-cylinder engine other than four-cylinder engine, such as a six-cylinder or eight-cylinder engine, and any other type of internal combustion engine, such as a diesel engine, an ethanol engine, and an LPG engine.

As described above, the present invention provides an engine control apparatus for controlling an engine mounted on a vehicle body, wherein the engine has a plurality of cylinders and is switchable between an all-cylinder operation in which combustion of an air-fuel mixture is performed in all of the cylinders and a reduced-cylinder operation in which the combustion in a specific part of the cylinders is stopped. The engine control apparatus comprises: an ignition device provided in each of the cylinders to ignite an air-fuel mixture in the cylinder, an intake air amount changing device capable of changing an intake air amount which is an amount of air to be taken into each of the cylinders; and a control device for controlling a plurality of target devices of the engine including the ignition device and the intake air amount changing device, wherein the control device is operable, upon issuance of a switching demand for switching from the all-cylinder operation to the reduced-cylinder operation, to set a target value of the intake air amount to a transient value which is greater than a target value of the intake air amount during the all-cylinder operation in a normal state in which there is no switching demand, and, when a difference between the transient target intake air amount and an actual intake air amount is greater than an allowable deficient intake air amount, to execute, before starting the reduced-cylinder operation, a preparatory control for increasing the actual intake air amount by the intake air amount changing device, and shifting an ignition timing of the ignition device toward a retard side with respect to an ignition timing during the all-cylinder operation in the normal state so as to cancel out a fluctuation in engine torque which would otherwise be caused by the increase in the actual intake air amount, and then start the reduced-cylinder operation at a time when the difference between the transient target intake air amount and the actual intake air amount becomes equal to or less than the allowable deficient intake air amount, and wherein the allowable deficient intake air amount is set to a larger value when a current speed stage of a vehicle transmission is a high speed stage than when it is a low speed stage.

In the engine control apparatus, upon issuance of the switching demand for switching to the reduced-cylinder operation, a target value of the intake air amount is increase to the transient value. Further, when the difference between the transient target intake air amount and the actual intake air amount is greater than the allowable deficient intake air amount, i.e., in a satiation where, if the switching demand for switching from the all-cylinder operation to the reduced-cylinder operation is immediately performed, the actual intake air amount becomes significantly deficient, possibly leading to large decrease in engine power output, before starting the reduced-cylinder operation, a preparatory control is executed to increase the actual intake air amount and shift the ignition timing toward a retard side so as to cancel out a fluctuation in engine torque which would otherwise be caused by the increase in the intake air amount, and then the reduced-cylinder operation is started at the time when the difference between the transient target intake air amount and the actual intake air amount become equal to or less than the allowable deficient intake air amount. Thus, before starting the reduced-cylinder operation, it becomes possible to increase the actual intake air amount while suppressing an increase in engine torque, i.e., engine power output by means of retard of the ignition timing, and start the reduced-cylinder operation in a state in which the actual intake air amount is ensured. This makes it possible to suppress a fluctuation in engine power output before and after the switching from the all-cylinder operation to the reduced-cylinder operation.

In addition, the allowable deficient intake air amount is set to a larger value on the side of the high speed stage. This makes it possible to start the reduced-cylinder operation at an earlier stage, while providing good riding comfort.

Specifically, a force derived by multiplying an engine power output by a speed reduction ratio is transmitted from the engine to the vehicle wheels. For this reason, in the high speed stage having a relatively low speed reduction stage, an amount of fluctuation in vehicle wheel driving force (vehicle wheel driving force with respect to a road surface, hereinafter appropriately referred to as "vehicle wheel-side driving force") with respect to an amount of fluctuation in engine power output is smaller. Thus, even when, in the high speed stage, the amount of fluctuation in engine power output is relatively large, i.e., the deficiency in intake air amount at start of the reduced-cylinder operation is relatively large, it becomes possible to suppress an amount of fluctuation in vehicle wheel-side driving force and thus an amount of movement in vehicle body to be felt by a passenger, thereby ensuring good riding comfort. In this regard, in the present invention, the allowable deficient intake air amount is set to become larger on the side of the high speed stage, so that, in the high speed stage, the reduced-cylinder operation is started at a time when the deficiency in intake air amount with respect to the transient target intake air amount is relatively large, i.e., at a relatively early timing when the actual intake air amount is not sufficiently increased. Thus, the present invention makes it possible to start the reduced-cylinder operation at an earlier timing, while ensuring good riding comfort.

It should be noted that the engine control apparatus of the present invention encompasses both of a configuration in which the allowable deficient intake air amount is set to a relatively small value in each of the speed stages, and the preparatory control is executed in all of the speed stages, and a configuration in which the allowable deficient intake air amount is set to a relatively large value in a given high speed stage, and the preparatory control is not executed in the given high speed stage.

Preferably, in the engine control apparatus of the present invention, the control device is operable, in a situation where the difference between the transient target intake air amount and the actual intake air amount is equal to or less than the allowable deficient intake air amount, at the time when the switching demand for switching from the all-cylinder operation to the reduced-cylinder operation is issued, to start the reduced-cylinder operation immediately after the issuance of the switching demand.

This makes it possible to state the reduced-cylinder operation at an earlier stage.

Preferably, in the engine control apparatus of the present invention, the allowable deficient intake air amount is set to a larger value as the current speed stage is a higher speed stage.

This makes it possible to start the reduced-cylinder operation at an early stage and at an adequate timing, while providing good riding comfort in each of the speed stages.

Preferably, in the engine control apparatus of the present invention, the allowable deficient intake air amount is set such that an amount of fluctuation in driving force transmitted from the engine to a vehicle wheel is maintained at a same value, irrespective of the speed stages.

This makes it possible to even out the amount of fluctuation in vehicle wheel-side driving force during the switching to the reduced-cylinder operation, irrespective of the speed stages to thereby stably provide good riding comfort.

This application is based on Japanese Patent application No. 2015-029361 filed in Japan Patent Office on Feb. 18, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An engine control apparatus for controlling an engine mounted on a vehicle body, wherein the engine has a plurality of cylinders and is switchable between an all-cylinder operation in which combustion of an air-fuel mixture is performed in all of the cylinders and a reduced-cylinder operation in which the combustion in one or more of the cylinders is stopped, the engine control apparatus comprising:
 an ignition device provided in each of the cylinders, the ignition device configured to ignite an air-fuel mixture in the cylinder;
 an intake air amount changing device configured to change an intake air amount which is an amount of air to be taken into each of the cylinders;
 an intake air amount detecting device configured to detect the intake air amount; and
 a control device configured to control a plurality of target devices of the engine including the ignition device, and the intake air amount changing device, and the intake air amount detecting device, the control device configured to store an allowable deficient intake air amount value,
 wherein the control device is configured, upon issuance of a switching demand for switching from the all-cylinder operation to the reduced-cylinder operation, to change a current opening angle of the intake air amount changing device to an opening angle during the reduced-cylinder operation, which is closer to a fully-open side than an opening angle during the all-cylinder operation in a normal state, calculate a difference between the transient target intake air amount and an actual intake air amount detected by the intake air amount detecting device, and, when the difference is greater than an allowable deficient intake air amount value stored in the control device, to execute, before starting the reduced-cylinder operation, a preparatory control for increasing the actual intake air amount by the intake air amount changing device, and shifting an ignition timing of the ignition device toward a retard side with respect to an ignition timing during the all-cylinder operation in the normal state so as to cancel out a fluctuation in engine torque which would otherwise be caused by the increase in the actual intake air amount detected by the intake air amount detecting device, and then start the reduced-cylinder operation at a time when the difference between the transient target intake air amount and the actual intake air amount detected by the intake air amount detecting device becomes equal to or less than the allowable deficient intake air amount, and
 wherein the allowable deficient intake air amount stored in the control device is set to a larger value when a current speed reduction ratio of a vehicle transmission is a high speed reduction ratio than when the current speed reduction ratio of the vehicle transmission is a low speed reduction ratio.

2. The engine control apparatus as recited in claim 1, wherein the control device is operable, in a situation where the difference between the transient target intake air amount and the actual intake air amount is equal to or less than the allowable deficient intake air amount, at the time when the switching demand for switching from the all-cylinder operation to the reduced-cylinder operation is issued, to start the reduced-cylinder operation immediately after the issuance of the switching demand.

3. The engine control apparatus as recited in claim 1, wherein the allowable deficient intake air amount is set to a larger value as the current speed stage is a higher speed reduction ratio.

4. The engine control apparatus as recited in claim 1, wherein the allowable deficient intake air amount is set such that an amount of fluctuation in driving force transmitted from the engine to a vehicle wheel is maintained at a same value, irrespective of the speed stages.

5. An engine control method for controlling an engine mounted on a vehicle body, wherein the engine has a plurality of cylinders and is switchable between an all-cylinder operation in which combustion of an air-fuel mixture is performed in all of the cylinders and a reduced-cylinder operation in which the combustion in one or more of the cylinders is stopped, the engine control apparatus comprising:
 an ignition device provided in each of the cylinders, the ignition device configured to ignite an air-fuel mixture in the cylinder;
 an intake air amount changing device configured to change an intake air amount, which is an amount of air to be taken into each of the cylinders;
 an intake air amount detecting device configured to detect the intake air amount; and
 a control device configured to control a plurality of target devices of the engine including the ignition device, the intake air amount changing device, and the intake air amount detecting device, the control device configured to store an allowable deficient intake air amount value,
 wherein the control device is configured, upon issuance of a switching demand for switching from the all-cylinder operation to the reduced-cylinder operation, to change a current opening angle of the intake air amount changing device to an opening angle during the reduced-cylinder operation, which is closer to a fully-open side than an opening angle during the all-cylinder operation in a normal state, calculate a difference between the transient target intake air amount and an actual intake air amount detected by the intake air amount detecting device, and, when the difference is greater than an allowable deficient intake air amount value stored in the control device, to execute, before starting the reduced-cylinder operation, a preparatory control for increasing the actual intake air amount by the intake air amount changing device, and shifting an ignition timing of the ignition device toward a retard side with respect to an ignition timing during the all-cylinder operation in the normal state so as to cancel out a fluctuation in engine torque, which would otherwise be caused by the increase in the actual intake air amount detected by the intake air amount detecting device, and then start the reduced-cylinder operation at a time when the difference between the transient target intake air amount and the actual intake air amount detected by the intake air amount detecting device becomes equal to or less than the allowable deficient intake air amount, and wherein the allowable deficient intake air amount stored in the control device is set to a larger value when a current speed reduction ratio of a vehicle transmission is a high speed reduction ratio than when the current speed reduction ratio of the vehicle transmission is a low speed reduction ratio.

\* \* \* \* \*